United States Patent
Wang et al.

(10) Patent No.: US 12,253,750 B2
(45) Date of Patent: Mar. 18, 2025

(54) LIQUID CRYSTAL HANDWRITING BOARD, HANDWRITING SYSTEM, AND CONTROL METHOD FOR HANDWRITING SYSTEM

(71) Applicants: Beijing BOE Optoelectronics Technology Co., Ltd., Beijing (CN); BOE Technology Group Co., Ltd., Beijing (CN)

(72) Inventors: Jiaxing Wang, Beijing (CN); Hao Yan, Beijing (CN); Xiaojuan Wu, Beijing (CN); Hongliang Yuan, Beijing (CN); Jian Wang, Beijing (CN); Yao Bi, Beijing (CN); Jinshuai Duan, Beijing (CN); Yang Ge, Beijing (CN); Zhilong Duan, Beijing (CN); Zhiqiang Yu, Beijing (CN); Xianglei Qin, Beijing (CN); Xiuliang Wang, Beijing (CN); Xiaofeng Yin, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/282,985

(22) PCT Filed: Aug. 22, 2022

(86) PCT No.: PCT/CN2022/114041
§ 371 (c)(1),
(2) Date: Sep. 19, 2023

(87) PCT Pub. No.: WO2023/045667
PCT Pub. Date: Mar. 30, 2023

(65) Prior Publication Data
US 2024/0176178 A1    May 30, 2024

(30) Foreign Application Priority Data

Sep. 24, 2021 (CN) .......................... 202111124118.1

(51) Int. Cl.
*G02F 1/1333* (2006.01)
*G02F 1/133* (2006.01)
(Continued)

(52) U.S. Cl.
CPC ...... *G02F 1/13338* (2013.01); *G02F 1/13318* (2013.01); *G02F 1/133512* (2013.01); *G02F 1/1368* (2013.01); *G02F 1/1391* (2013.01)

(58) Field of Classification Search
None
See application file for complete search history.

(56) References Cited

U.S. PATENT DOCUMENTS

2004/0169625 A1* 9/2004 Park .................. G06F 3/042
                                                    345/87
2019/0302503 A1  10/2019 Liao et al.
(Continued)

FOREIGN PATENT DOCUMENTS

CN    2461065 Y    11/2001
CN    1525223 A     9/2004
(Continued)

OTHER PUBLICATIONS

CN202111124118.1 Notification to grant patent right for invention.

*Primary Examiner* — Dung T Nguyen
(74) *Attorney, Agent, or Firm* — IPro, PLLC

(57) ABSTRACT

Provided is a liquid crystal handwriting board. The liquid crystal handwriting board includes: a liquid crystal panel, a photosensitive assembly, and a control assembly; wherein the liquid crystal panel includes a first substrate and a second substrate that are opposite; the photosensitive assembly includes a plurality of photosensitive elements; and the
(Continued)

control assembly is electrically connected to the liquid crystal panel and the photosensitive assembly, and is configured to determine position information of a pixel region for erasure by detecting position information of target light irradiated to the liquid crystal panel by the photosensitive assembly and supply a pixel voltage to the plurality of pixel electrodes in the pixel region for erasure, such that a voltage difference is present between the plurality of pixel electrodes in the pixel region for erasure and the common electrode.

16 Claims, 11 Drawing Sheets

(51) Int. Cl.
*G02F 1/1335* (2006.01)
*G02F 1/1368* (2006.01)
*G02F 1/139* (2006.01)

(56) References Cited

U.S. PATENT DOCUMENTS

| | | | |
|---|---|---|---|
| 2019/0324308 A1* | 10/2019 | Liao | G02F 1/13338 |
| 2021/0223880 A1 | 7/2021 | Zhang et al. | |
| 2023/0134866 A1 | 5/2023 | Ge et al. | |
| 2023/0176436 A1 | 6/2023 | Li et al. | |

FOREIGN PATENT DOCUMENTS

| | | |
|---|---|---|
| CN | 101236467 A | 8/2008 |
| CN | 107274823 A | 10/2017 |
| CN | 112327546 A | 2/2021 |
| CN | 112684618 A | 4/2021 |
| CN | 113419367 A | 9/2021 |
| CN | 113419388 A | 9/2021 |
| CN | 113848662 A | 12/2021 |
| CN | 113867024 A | 12/2021 |
| JP | 2006243850 A | 9/2006 |
| JP | 2007133824 A | 5/2007 |

* cited by examiner

400

200

B-B'

LIQUID CRYSTAL HANDWRITING BOARD, HANDWRITING SYSTEM, AND CONTROL METHOD FOR HANDWRITING SYSTEM

CROSS-REFERENCE TO RELATED APPLICATION

This application is a U.S. national stage of international application No. PCT/CN2022/114041, filed on Aug. 22, 2022, which claims priority to Chinese Patent Application No. 202111124118.1, filed on Sep. 24, 2021 and entitled "LIQUID CRYSTAL HANDWRITING BOARD, HANDWRITING SYSTEM AND CONTROL METHOD FOR HANDWRITING SYSTEM," the disclosure of which is incorporated herein by reference in its entirety.

TECHNICAL FIELD

The present disclosure relates to the field of display technologies, and in particular, relates to a liquid crystal handwriting board, a handwriting system, and a method for controlling a handwriting system.

BACKGROUND OF THE INVENTION

Handwriting boards are electronic devices for character writing and drawing. Liquid crystal handwriting boards have advantages of low power consumption and clear handwriting, and thus have occupied a greater market share in recent years.

SUMMARY OF THE INVENTION

Embodiments of the present disclosure provide a liquid crystal handwriting board, a handwriting system, and a method for controlling a handwriting system.

In some embodiments of the present disclosure, a liquid crystal handwriting board is provided. The liquid crystal handwriting board includes: a liquid crystal panel, a photosensitive assembly, and a control assembly; wherein
  the liquid crystal panel includes a first substrate and a second substrate that are opposite, wherein the first substrate includes a plurality of pixel regions and a plurality of pixel electrodes in the plurality of pixel regions, and the second substrate includes a common electrode;
  the photosensitive assembly includes a plurality of photosensitive elements, wherein one of the plurality of photosensitive elements corresponds to at least one of the plurality of pixel regions, and an orthogonal projection of each of the plurality of photosensitive elements on the first substrate is at least partially overlapped with the corresponding at least one of the plurality of pixel regions; and
  the control assembly is electrically connected to the liquid crystal panel and the photosensitive assembly, and is configured to determine position information of a pixel region for erasure by detecting position information of target light irradiated to the liquid crystal panel by the photosensitive assembly and supply a pixel voltage to the plurality of pixel electrodes in the pixel region for erasure, such that a voltage difference is present between the plurality of pixel electrodes in the pixel region for erasure and the common electrode.

In some embodiments, the photosensitive assembly is disposed on a side, distal from the second substrate, of the first substrate.

In some embodiments, the liquid crystal handwriting board further including: a black matrix, wherein the black matrix is disposed between the plurality of pixel electrodes and the plurality of photosensitive elements, and a plurality of light apertures are defined in the black matrix, wherein the plurality of light apertures are in one-to-one correspondence to the plurality of pixel regions, an orthogonal projection of each of the plurality of light apertures on the first substrate is within the corresponding pixel region, each of the plurality of photosensitive elements corresponds to at least one of the plurality of light apertures, and the orthogonal projection of each of the plurality of light apertures on the first substrate is at least partially overlapped with an orthogonal projection of the corresponding photosensitive element on the first substrate.

In some embodiments, in a target direction, in at least two light apertures corresponding to at least two adjacent pixel regions, an arrangement direction of any two adjacent light apertures in the at least two light apertures is intersected with the target direction, and the target direction is an arrangement direction of one row of pixel regions.

In some embodiments, the plurality of light apertures include at least one set of light apertures, wherein positions of orthogonal projections of the light apertures in each of the at least one set of light apertures on the first substrate in the corresponding pixel region are different.

In some embodiments, the first substrate includes a first base substrate, and the plurality of pixel electrodes and a plurality of driving thin-film transistors (TFTs) that are disposed on the first base substrate, wherein the plurality of pixel electrodes are electrically connected to the plurality of driving TFTs in one-to-one correspondence; wherein
  the black matrix is disposed on a side, facing away from the second substrate, of the first base substrate; or
  the black matrix is disposed on a side, facing towards the second substrate, of the first base substrate, and the first substrate further includes a first insulative layer between the black matrix and the plurality of driving TFTs.

In some embodiments, a proportion of an area of the orthogonal projection of each of the plurality of light apertures on the first substrate based on an area of the corresponding pixel region ranges from 5% to 20%.

In some embodiments, the photosensitive assembly includes a circuit board and the plurality of photosensitive elements on the circuit board, wherein the plurality of photosensitive elements are electrically connected to the circuit board, and the circuit board is electrically connected to the control assembly.

In some embodiments, the photosensitive assembly is integrated in the first substrate, the photosensitive assembly is a photosensitive thin-film transistor (TFT), a plurality of photosensitive TFTs are in one-to-one correspondence to the plurality of pixel regions, and each of the plurality of photosensitive TFTs is within the corresponding pixel region.

In some embodiments, the photosensitive assembly further includes a photosensitive signal line electrically connected to a first electrode of each of the plurality of photosensitive TFTs, and a first sensing line and a second sensing line that are electrically connected to a second electrode of each of the plurality of photosensitive TFTs, wherein
  the control assembly is electrically connected to the photosensitive signal line, the first sensing line, and the second sensing line, and an extension direction of the first sensing line is perpendicular to an extension direction of the second sensing line.

In some embodiments, the photosensitive assembly further includes a connecting electrode in a same layer as the plurality of pixel electrodes, wherein the connecting electrode is electrically connected to the second electrode of each of the plurality of photosensitive TFTs and the second sensing line.

In some embodiments, the first substrate includes a first base substrate, and the plurality of pixel electrodes and a plurality of driving TFTs that are disposed on the first base substrate, wherein the plurality of pixel electrodes are electrically connected to the plurality of driving TFTs in one-to-one correspondence, and the plurality of driving TFTs and the plurality of photosensitive TFTs are disposed in the same layer.

In some embodiments, the liquid crystal handwriting board further includes: a bistable liquid crystal molecule layer between the first substrate and a second substrate, wherein bistable liquid crystal molecules in the bistable liquid crystal molecule layer are configured to: transform from a focal cone texture to a planar texture in the case that an external pressure is supplied on the liquid crystal panel, and transform from the planar texture to the focal cone texture in the case that the voltage difference is present between the plurality of pixel electrodes in the pixel region for erasure and the common electrode.

In some embodiments of the present disclosure, a handwriting system is provided. The handwriting system includes: an erasing tool and the above liquid crystal handwriting board; wherein the erasing tool includes a light-emitting assembly, and the liquid crystal handwriting board is configured to determine position information of a pixel region for erasure by detecting position information of target light by the photosensitive assembly upon emission of the target light to the liquid crystal panel by the light-emitting assembly of the erasing tool.

In some embodiments of the present disclosure, a method for controlling a handwriting system is provided. The method is applicable to the above handwriting system, and includes:

determining, by the liquid crystal handwriting board, position information of a pixel region for erasure by detecting position information of target light by the photosensitive assembly upon emission of the target light to the liquid crystal panel by the light-emitting assembly of the erasing tool; and supplying, by the liquid crystal handwriting board, a pixel voltage to the pixel electrodes in the pixel region for erasure based on the position information of the pixel region for erasure by the control assembly, such that a voltage difference is present between the pixel electrodes in the pixel region for erasure and the common electrode.

BRIEF DESCRIPTION OF DRAWINGS

For clearer description of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE INVENTION

For clearer descriptions of the objectives, technical solutions, and advantages of the present disclosure, the embodiments of the present disclosure are described in detail hereinafter with reference to the accompanying drawings.

Figure 1:
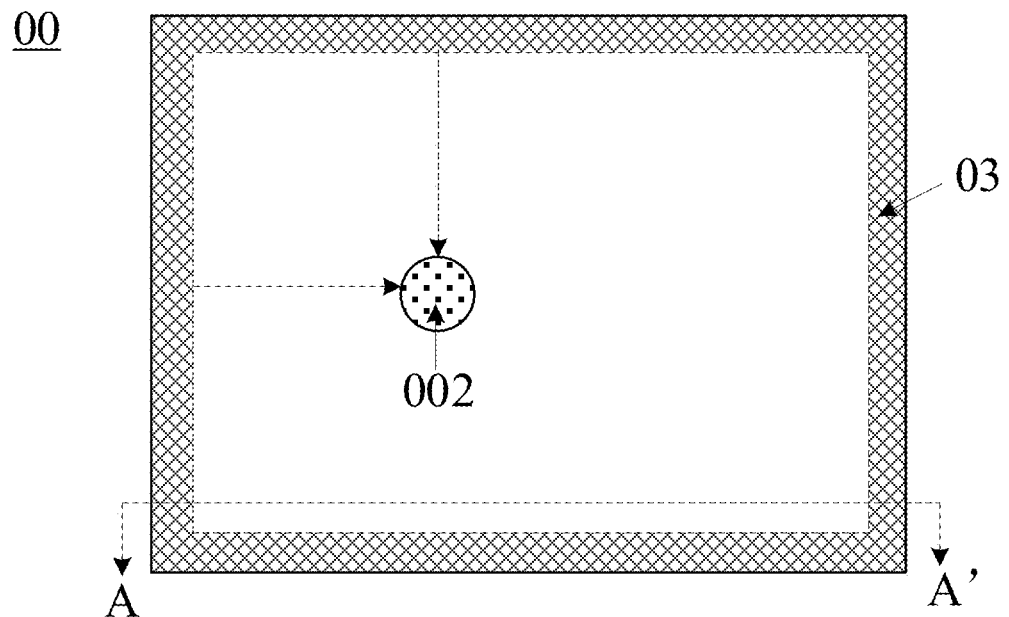
FIG. 1 is a top view of a liquid crystal handwriting board in some practices.
Figure 2:
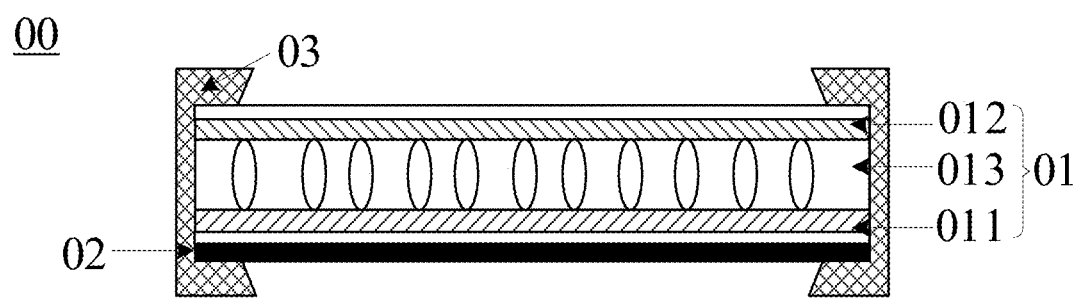
FIG. 2 is a cross-sectional view of the liquid crystal handwriting board shown in FIG. 1 at A-A'.

In some practices, in order to local erasure of the handwriting displayed on the liquid crystal handwriting board, it is necessary to integrate an infrared positioning apparatus in the liquid crystal handwriting board. During erasure of the handwriting by an erasing tool (for example, an eraser), a position of the erasing tool on the liquid crystal handwriting board is determined by the infrared positioning apparatus to determine a region for erasure on the liquid crystal handwriting board. Afterwards, the liquid crystal handwriting board controls pixel electrodes in the region for erasure to erase the handwriting in the region for erasure. Referring to FIG. 1 and FIG. 2, FIG. 1 is a top view of a liquid crystal handwriting board according to some practices, and FIG. 2 is a cross-sectional view of the liquid crystal handwriting board shown in FIG. 1 at A-A'. The liquid crystal handwriting board 00 generally includes: a liquid crystal panel 01, a black aluminum honeycomb panel 02, and an infrared positioning apparatus 03.

The liquid crystal panel 01 includes: a first substrate 011 and a second substrate 012 that are opposite, and a liquid crystal layer 013 disposed between the first substrate 011 and the second substrate 012. The first substrate 011 is generally provided with a plurality of pixel electrodes (not shown in drawings) arranged in an array, and the second substrate 012 is provided with a planar common electrode (not shown in drawings). Liquid crystal molecules in the liquid crystal layer 013 are bistable liquid crystal molecules.

The black aluminum honeycomb panel 02 is disposed on a side, distal from the second substrate 012, of the first substrate 011. The infrared positioning apparatus 03 is disposed on a periphery of the liquid crystal panel 01 and the black aluminum honeycomb panel 02. The infrared positioning apparatus 03 requires to be protruded from the liquid crystal panel 01 and can emit infrared rays, such that a position of an erasing tool on the liquid crystal panel 01 is determined.

Figure 3:
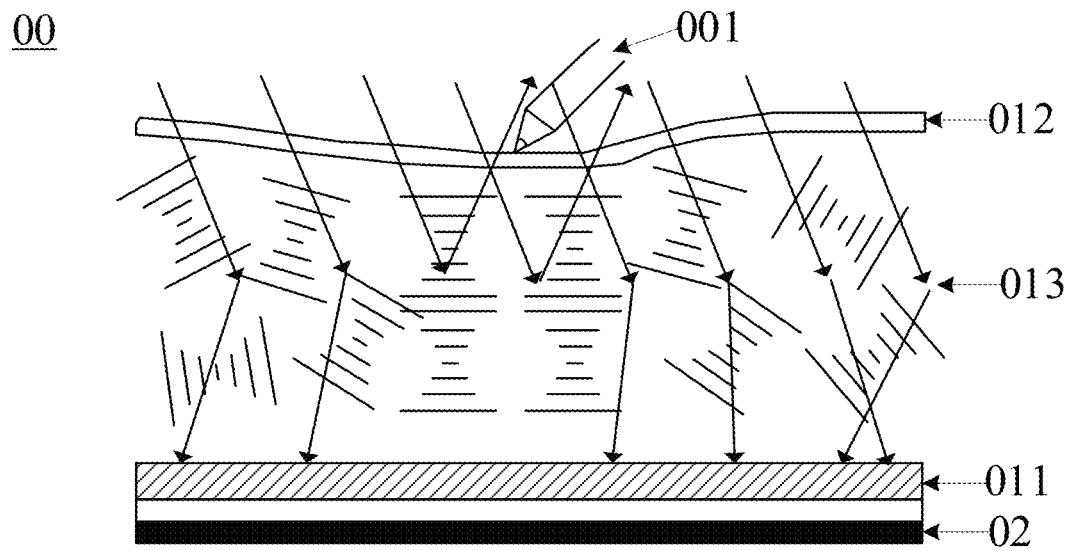
FIG. 3 is a schematic diagram of a principle of displaying handwriting on the liquid crystal handwriting board shown in FIG. 1.

As shown in FIG. 3, FIG. 3 is a schematic diagram of a principle of displaying handwriting on the liquid crystal handwriting board shown in FIG. 1. In the case that the liquid crystal handwriting board 00 is in a writing mode, a writing tool 001 (for example, a handwriting pen) supplied a pressure on the liquid crystal panel 01, such that a part of liquid crystal molecules in the liquid crystal layer 013 of the liquid crystal panel 01 are transformed from a focal cone texture to a planar texture under an action of an external pressure. As such, the liquid crystal molecules transformed to the planar texture can reflect light (for example, green light) with a specific wavelength in the incident ambient light, such that the liquid crystal handwriting board displays the handwriting.

In the case that the liquid crystal handwriting board 00 is in an erasing mode, the erasing tool 002 moves on the liquid crystal panel 01, the liquid crystal handwriting board 00 determines a position of the erasing tool 002 on the liquid crystal panel 01 based on infrared rays emitted by the infrared positioning apparatus 03, and then a region for erasure is determined from the liquid crystal handwriting board 00. Afterwards, the liquid crystal handwriting board applies a voltage to the pixel electrodes in the region for erasure, such that a voltage difference is present between the pixel electrodes in the region for erasure and the common electrode, and then the liquid crystal molecules in the region for erasure are rearranged under an action of the voltage difference, that is, the liquid crystal molecules are transformed from the planar texture to the focal cone texture. In this way, the liquid crystal molecules transformed to the focal cone texture transmit incident ambient light, such that the region for erasure shows a black background with the same color as the black aluminum honeycomb panel 02, and the erasure of the handwriting in the region for erasure is achieved.

The infrared positioning apparatus 03 in the liquid crystal handwriting board 00 generally requires to distinguish the writing tool 001 and the erasing tool 002 to ensure that the writing tool 001 normally writes on the liquid crystal handwriting board 00 and the erasing tool 002 erases the handwriting displayed on the liquid crystal handwriting board 00. Thus, a face, in contact with the liquid crystal handwriting board 00, of the erasing tool 002 requires to be much greater than a face, in contact with the liquid crystal handwriting board 00, of the writing tool 001, such that the infrared positioning apparatus 03 distinguishes the writing tool 001 and the erasing tool 002 by detecting a contact area of an object and the liquid crystal handwriting board 00.

However, a hand of a user tends to in contact with the liquid crystal handwriting board in the case that the user writes on the liquid crystal handwriting board 00 by the writing tool 001, and a contact area of the hand of the user and the liquid crystal handwriting board 00 is generally great, such that the infrared positioning apparatus 03 is prone to determining that the hand of the user is the erasing tool 002, and handwriting in a contact region of the hand of the user and the liquid crystal handwriting board 00 is falsely erased. As such, an effect of locally erasing the liquid crystal handwriting board is poor.

Figure 4:
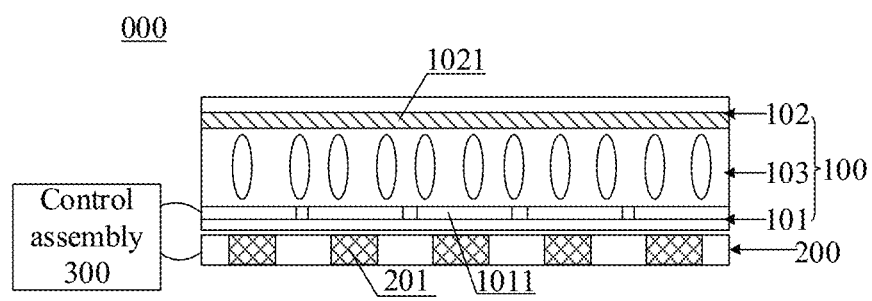
FIG. 4 is a schematic structural diagram of a liquid crystal handwriting board according to some embodiments of the present disclosure.

Referring to FIG. 4, FIG. 4 is a schematic structural diagram of a liquid crystal handwriting board according to some embodiments of the present disclosure. The liquid crystal handwriting board 000 includes:

a liquid crystal panel 100, a photosensitive assembly 200, and a control assembly 300.

The liquid crystal panel 100 includes a first substrate 101 and a second substrate 102 that are opposite. In the embodiments of the present disclosure, the liquid crystal panel 100 further includes a liquid crystal layer 103 between the first substrate 101 and the second substrate 102. In some embodiments, the liquid crystal layer 103 is a bistable liquid crystal molecule layer, that is, liquid crystal molecules in the liquid crystal layer 103 are bistable liquid crystal molecules. Illustratively, the bistable liquid crystal molecules are configured to transform from a focal cone texture to a planar texture in the case that an external pressure is supplied on the liquid crystal panel 100 in the liquid crystal handwriting board 000. For example, in the case that the user writes on the liquid crystal handwriting board 000 by the writing tool, the user supplies a pressure on the liquid crystal panel 100 by the writing tool, such that the bistable liquid crystal molecules in a region supplied with the pressure in the liquid crystal panel 100 are transformed from the focal cone texture to the planar texture. In this case, the bistable liquid crystal molecules in the planar texture can reflect light (for example, green light) with a specific wavelength in the incident ambient light irradiated to the liquid crystal panel 100, such that the liquid crystal handwriting board 000 displays the corresponding handwriting.

The first substrate 101 in the liquid crystal panel 100 includes a plurality of pixel regions 101a (not annotated in FIG. 4 but annotated in FIG. 6) and a pixel electrode 1011 in the pixel region 101a. Illustratively, one pixel electrode 1011 is disposed in each pixel region 101a in the first substrate 101, and the pixel electrode 1011 is a block electrode. The plurality of pixel regions 101a in the first substrate 101 are arranged in an array, and thus a plurality of pixel electrodes 1011 in the first substrate 101 are also arranged in an array. It should be noted that the first substrate 101 further includes a plurality of data signal lines and a plurality of gate lines (that is, the following first gate line G1), any two adjacent data signal lines and any two adjacent gate liens enclose one pixel region 101a, and one pixel electrode 1011 in the first substrate 101 is disposed in one pixel region 101a.

The second substrate 102 in the liquid crystal panel 100 includes a common electrode 1021. Illustratively, the common electrode 1021 in the second substrate 102 is a planar electrode, that is, the common electrode 1021 is a whole-layer electrode.

The photosensitive assembly 200 includes a plurality of photosensitive elements 201. One photosensitive element 201 corresponds to at least one pixel region 101a in the first substrate 101, and an orthogonal projection of each photosensitive element 201 in the photosensitive assembly 200 on the first substrate 101 is at least partially overlapped with the corresponding at least one pixel region 101a. In the present disclosure, each photosensitive element 201 in the photosensitive assembly 200 corresponds to at least one pixel region 101a.

The control assembly 300 is electrically connected to the liquid crystal panel 100 and the photosensitive assembly 200. Illustratively, the control assembly 300 is electrically connected to the liquid crystal panel 100 and the pixel electrodes 1011, and the control assembly 300 is further electrically connected to the photosensitive elements 201 in the photosensitive assembly 200.

The control assembly 300 is configured to determine position information of a pixel region for erasure by detecting position information of target light irradiated to the liquid crystal panel 100 by the photosensitive assembly 200 and supply a pixel voltage to the pixel electrodes 1011 in the pixel region for erasure, such that a voltage difference is present between the pixel electrodes 1011 in the pixel region for erasure and the common electrode 1021.

In the embodiments of the present disclosure, in the case that the handwriting displayed on the liquid crystal handwriting board 000 requires to be erased, an erasing tool capable of emitting the target light is used to erase the handwriting. As the orthogonal projection of the photosensitive element 201 in the photosensitive assembly 200 on the first substrate 101 is at least partially overlapped with the corresponding at least one pixel region 101a, at least a part of photosensitive elements 201 in the photosensitive assembly 200 senses the target light emitted from the erasing tool and passing through the liquid crystal panel 100 upon emission of the target light from the erasing tool to the liquid crystal panel 100, and the position of the target light irradiated to the liquid crystal panel 100 is determined by the control assembly 300. The position of the light irradiated to the liquid crystal panel 100 is a position of the pixel region for erasure.

In some embodiments, the plurality of photosensitive elements 201 in the photosensitive assembly 200 are arranged in an array, and thus the control assembly 300 can determine the position information of a photosensitive element in the plurality of photosensitive elements 201 upon sensing the target light emitted from the erasing tool by the photosensitive element in the photosensitive assembly 200. Then, the control assembly 300 determines the position information of the target light irradiated to the liquid crystal panel 100 based on the position information of the photosensitive element in the plurality of photosensitive elements and the corresponding relationship of the photosensitive elements 201 and the pixel regions 101a, such that the position information of the pixel region for erasure is acquired.

As such, the liquid crystal handwriting board detects the position information of the pixel region for erasure by the photosensitive assembly 200, and then supplies the pixel voltage to the pixel electrodes 1011 in the pixel region for erasure by the control assembly 300, such that the voltage difference is present between the pixel electrodes 1011 in the pixel region for erasure and the common electrode 1021. Illustratively, the bistable liquid crystal molecules are further configured to transform form the planar texture to the focal cone texture in the case that the voltage difference is present between the pixel electrodes 1011 in the pixel region for erasure and the common electrode 1021. For example, in the case that the user erases the liquid crystal handwriting board 000 by the erasing tool capable of emitting the target light, the user emits the target light to the liquid crystal panel 100 by the erasing tool, such that the control assembly 300 determines the pixel region for erasure and supplies the pixel voltage to the pixel electrodes 1011 in the pixel region for erasure, and the voltage difference is present between the pixel electrodes 1011 in the pixel region for erasure and the common electrode 1021. Furthermore, the bistable liquid crystal molecules in the pixel region for erasure in the liquid crystal handwriting board 000 are transformed from the planar texture to the focal cone texture. As such, the bistable liquid crystal molecules in the focal cone texture transmit the ambient light irradiated to the liquid crystal panel 100, such that the erasure of the handwriting in the pixel region for erasure is achieved.

In summary, the liquid crystal handwriting board in the embodiments of the present disclosure includes: a liquid crystal panel, a photosensitive assembly, and a control assembly. In the case that handwriting displayed on the liquid crystal handwriting board requires to be erased, an erasing tool capable of emitting target light erases the handwriting. As an orthogonal projection of a photosensitive element in the photosensitive assembly on a first substrate of the liquid crystal panel is at least partially overlapped with the corresponding pixel region, the photosensitive assembly determines a position of target light irradiated to the liquid crystal panel by detecting the target light by at least a part of photosensitive elements upon emission of the target light to the liquid crystal panel by the erasing tool, and the position of target light irradiated to the liquid crystal panel is a position of a pixel region for erasure. As such, the liquid crystal handwriting board supplies a pixel voltage to pixel electrodes in the pixel region for erasure by the control assembly, such that the erasure of the handwriting in the pixel region for erasure is achieved. In this case, even if a hand of a user is in contact with the liquid crystal handwriting board in writing, the photosensitive assembly does not determine a region in which the user is in contact with the liquid crystal handwriting board as the pixel region for erasure, such that a possibility of false erasure in the liquid crystal handwriting board is reduced, and an effect of locally erasing the liquid crystal handwriting board is efficiently improved.

It should be noted that a light intensity of the target light requires to be much greater than a light intensity of the ambient light to ensure that the photosensitive assembly 200 distinguishes the target light and the ambient light. As the photosensitive assembly 200 is generally disposed on a side, distal from the second substrate 102, of the liquid crystal layer 103 in the liquid crystal panel 100, the target light generally requires to pass through the liquid crystal layer 103 and irradiate to the photosensitive assembly 200. In the case that the bistable liquid crystal molecules in the liquid crystal handwriting board 000 are in the planar texture, the bistable liquid crystal molecules reflect the green light. Thus, the target light requires to be light of colors other than the green light to ensure that the target light normally passes through the bistable liquid crystal molecules in the planar texture. For example, the target light is a white light, a red light, a blue light, and the like.

In the embodiments of the present disclosure, the photosensitive assembly 200 in the liquid crystal handwriting board 000 are of many structures, and the embodiments of the present disclosure are illustrated in the following two optional implementations.

Figure 5:
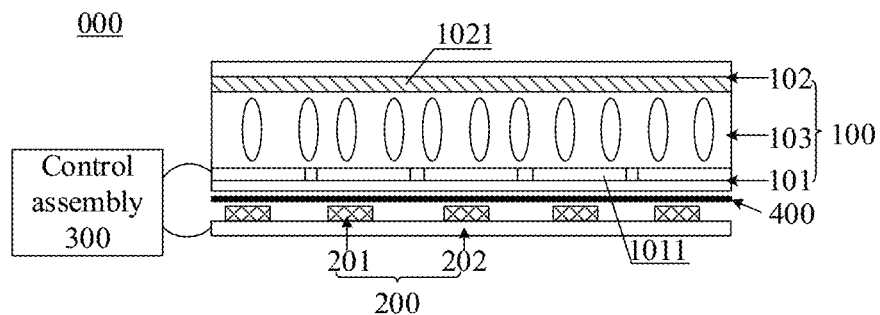
FIG. 5 is a schematic structural diagram of another liquid crystal handwriting board according to some embodiments of the present disclosure.

In a first optional implementation, referring to FIG. 5, FIG. 5 is a schematic structural diagram of another liquid crystal handwriting board according to some embodiments of the present disclosure. The photosensitive assembly 200 in the liquid crystal handwriting board 000 is disposed on a side, distal from the second substrate 102, of the first substrate 101. Illustratively, the photosensitive assembly 200 includes a circuit board 202 and the plurality of photosensitive elements 201 on the circuit board 202. The plurality of photosensitive elements 201 in the photosensitive assembly 200 are all electrically connected to the circuit board 202, and the circuit board 202 is electrically connected to the control assembly 300. The control assembly 300 monitors parameters of the photosensitive elements 201 by the circuit board 202. In some embodiments, the photosensitive elements 201 in the photosensitive assembly 200 are all photosensitive resistors, photosensitive diodes, photosensitive transistors, or the like.

In this case, the photosensitive assembly 200 is attached to the side, distal from the second substrate 102, of the first substrate 101, and the plurality of photosensitive elements 201 in the photosensitive assembly 200 face towards the first substrate 101, such that the target light passing through the liquid crystal panel 100 is irradiated to the photosensitive element 201. Upon receiving of the target light by the photosensitive element 201, parameters (for example, a resistance) of the photosensitive element 201 are changed. As such, the control assembly 300 determines the position of the photosensitive element 201 with the changed parameters in the photosensitive assembly 200 by the circuit board 202, and the position information of the target light irradiated to the liquid crystal panel 100 is further determined. It should be noted that the circuit board 202 in the photosensitive assembly 200 is a printed circuit board (PCB) or a flexible printed circuit (FPC).

In some embodiments, the plurality of photosensitive elements 201 in the photosensitive assembly 200 are connected to the circuit board 202 through a surface mounted technology (SMT). For example, a plurality of solder pastes are printed on the circuit board 202, and the plurality of photosensitive elements 201 are transferred to the circuit board 202, such that the plurality of photosensitive elements 201 are in contact with the plurality of solder pastes in one-to-one correspondence. Then, a reflow soldering is performed on the circuit board, such that each of the plurality of photosensitive elements 201 is electrically connected to the circuit board 202 by the corresponding solder paste. Eventually, an optical detection is performed on the circuit board 202 including the plurality of photosensitive elements 201 by an automatic optic inspection (AOI).

In the embodiments of the present disclosure, the liquid crystal handwriting board 000 further includes a black matrix 400. The black matrix 400 in the liquid crystal handwriting board 000 is disposed between the plurality of pixel electrodes 1011 on the first substrate 101 and the plurality of photosensitive elements 201 in the photosensitive assembly 200.

Figure 6:
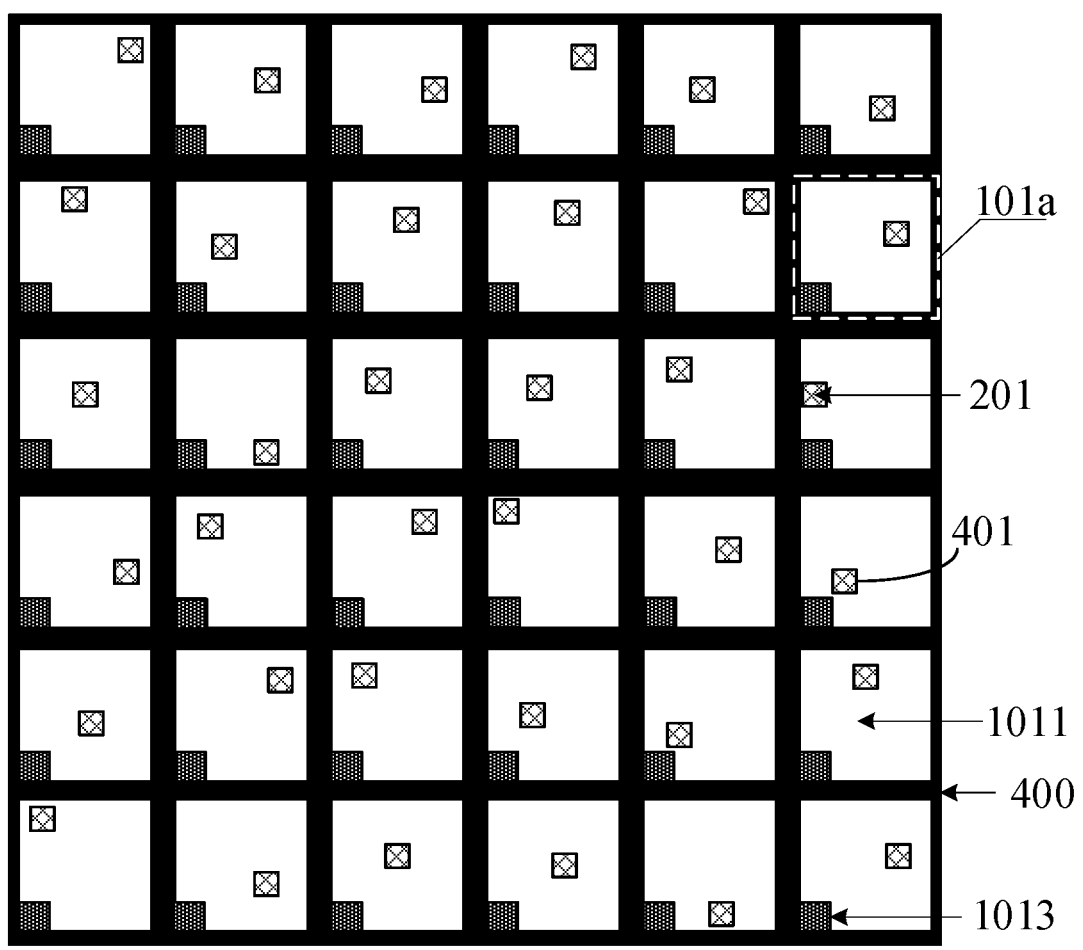
FIG. 6 is a top view of a first substrate, a black matrix, and a photosensitive assembly that are laminated according to some embodiments of the present disclosure.
Figure 7:
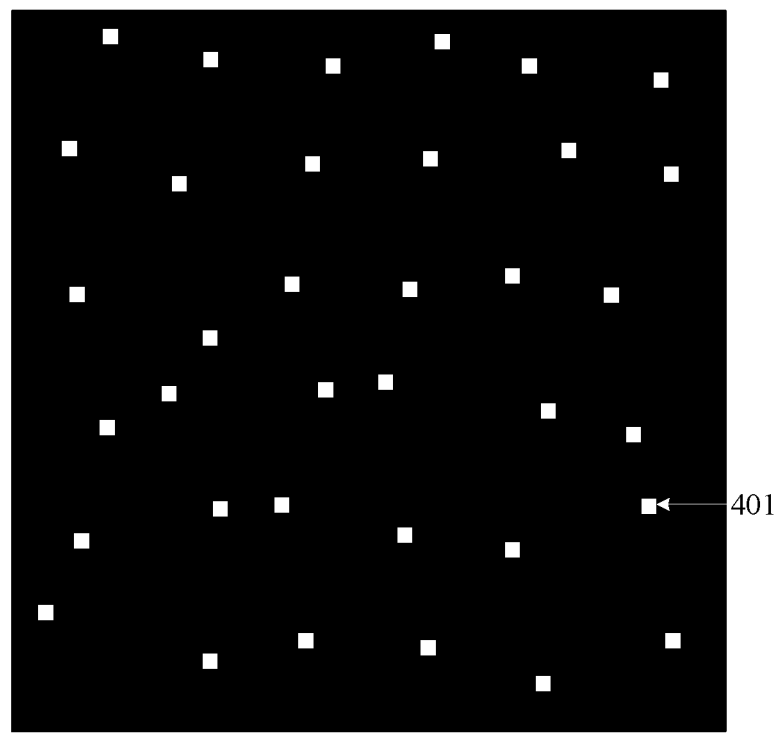
FIG. 7 is a top view of the black matrix in the structure shown in FIG. 6.
Figure 8:
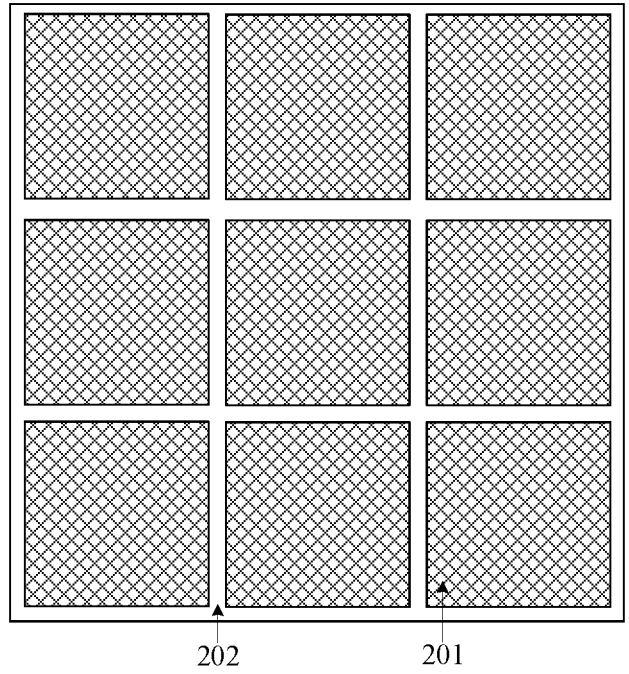
FIG. 8 is a top view of the photosensitive assembly in the structure shown in FIG. 6.

As shown in FIG. 6, FIG. 7, and FIG. 8, FIG. 6 is a top view of a first substrate, a black matrix, and a photosensitive assembly that are laminated according to some embodiments of the present disclosure, FIG. 7 is a top view of the black matrix in the structure shown in FIG. 6, and FIG. 8 is a top view of the photosensitive assembly in the structure shown in FIG. 6. A plurality of light apertures 401 are defined in the black matrix 400 in the liquid crystal handwriting board 000. The plurality of light apertures 401 in the black matrix 400 are in one-to-one correspondence to the plurality of pixel regions 101a in the first substrate 101, and an orthogonal projection of each of the plurality of light apertures 401 on the first substrate 101 is within the corresponding pixel region 101a. As each of the plurality of photosensitive elements 201 in the photosensitive assembly 200 corresponds to at least pixel region 101a, at least one of the plurality of light apertures 401 in the black matrix 400 corresponds to one of the plurality of photosensitive elements 201 in the photosensitive assembly 200, and the orthogonal projection of each of the plurality of light apertures 401 on the first substrate 101 is at least partially overlapped with an orthogonal projection of the corresponding photosensitive element 201 on the first substrate 101.

In this case, the target light irradiated to the pixel regions 101a in the first substrate 101 in the liquid crystal panel 100 sequentially passes through the corresponding light apertures and is irradiated to the corresponding photosensitive element 201 in the photosensitive assembly 200, such that the photosensitive assembly 200 senses the target light irradiated to any pixel region 101a by the plurality of photosensitive elements 201.

It should be noted that FIG. 6 is illustrated by taking the light apertures 401 in the black matrix 400 being in square shapes as an example. In some embodiments, the light apertures 401 in the black matrix 400 are in circular, rectangular, or other shapes, which is not limited in the embodiments of the present disclosure.

In some embodiments, as a width of the handwriting in writing on the liquid crystal handwriting board by the writing tool by the user is great, and a width of the pixel region 101a is less, each photosensitive element 201 in the photosensitive assembly 200 requires to correspond to a plurality of pixel regions 101a to improve an efficiency of erasing the handwriting. For example, each photosensitive element 201 corresponds to four pixel regions 101a, the four pixel regions 101a are arranged in two rows and two columns, and orthogonal projections of four pixel electrodes 1011 arranged in the four pixel regions 101a on the photosensitive assembly 200 are within regions of the corresponding photosensitive elements 201.

In this case, the four pixel regions 101a form a minimum erasing region. In the case that any pixel region 101a in the four pixel regions 101a receives irradiation of the target light, the corresponding photosensitive element 201 is detected, such that the handwriting displayed on the minimum erasing region formed by the four pixel regions 101a is erased.

In some embodiments, an area of the orthogonal projection of the light aperture 401 in the black matrix 400 on the first substrate 101 is not less to ensure that the target light normally passes through the light aperture 401 and is irradiated to the photosensitive element 201. The area of the orthogonal projection of the light aperture 401 in the black matrix 400 on the first substrate 101 is not great to ensure that the target light passes through the liquid crystal layer 103 and is absorbed by the black matrix 400 in the case that the bistable liquid crystal molecules in the liquid crystal handwriting board 000 are in the focal cone texture, such that the black background is displayed. Illustratively, a proportion of the area of the orthogonal projection of the light aperture 401 in the black matrix 400 on the first substrate 101 based on an area of the corresponding pixel region 101a ranges from 5% to 20%. For example, assuming that a size of the pixel region 101a in the first substrate 101 is 1 mm*1 mm, and the proportion of the area of the orthogonal projection of the light aperture 401 on the first substrate 101 based on the area of the corresponding pixel region 101a is 10%, a size of the light aperture 401 is 0.1 mm*0.1 mm.

In the embodiments of the present disclosure, in a target direction, in at least two light apertures 401 corresponding to at least two adjacent pixel regions 101a, an arrangement direction of any two adjacent light apertures 401 is intersected with the target direction. For example, the arrangement direction of two light apertures 401 corresponding to any two adjacent pixel regions 101a is intersected with the target direction. The target direction is an arrangement direction of one row of pixel regions 101a. The arrangement direction of the one row of pixel regions 101a is a row arrangement direction of the pixel regions 101a, a column arrangement direction of the pixel regions 101a, or an oblique arrangement direction of the pixel regions 101a. As such, the plurality light apertures 401 in the black matrix 400 are chaotically arranged, such that bright lines in a back face of the liquid crystal panel 100 due to light leakage in the case that the light apertures 401 in the black matrix 400 are arranged in one row or one column are avoided.

In some embodiments, the plurality of light apertures 401 in the black matrix 400 include at least one set of light apertures. Positions of orthogonal projections of the light apertures 401 in each of the at least one set of light apertures on the first substrate 101 in the corresponding pixel region 101a are different. In some embodiments of the present disclosure, in the case that the plurality of light apertures 401 in the black matrix 400 are organized to a plurality of sets of light apertures, the arrangements of the light apertures 401 in the plurality of sets of light apertures are the same. For example, 36 light apertures 401 corresponding to each 36 pixel regions 101a form one set of light apertures, and the 36 pixel regions 101a are arranged in six rows and six columns. The positions of the orthogonal projections of the light apertures 401 in each set of light apertures on the first substrate 101 in the corresponding pixel region 101a are different. The difficulty of manufacturing the black matrix 400 is efficiently reduced by organizing the plurality of light apertures 401.

Figure 9:
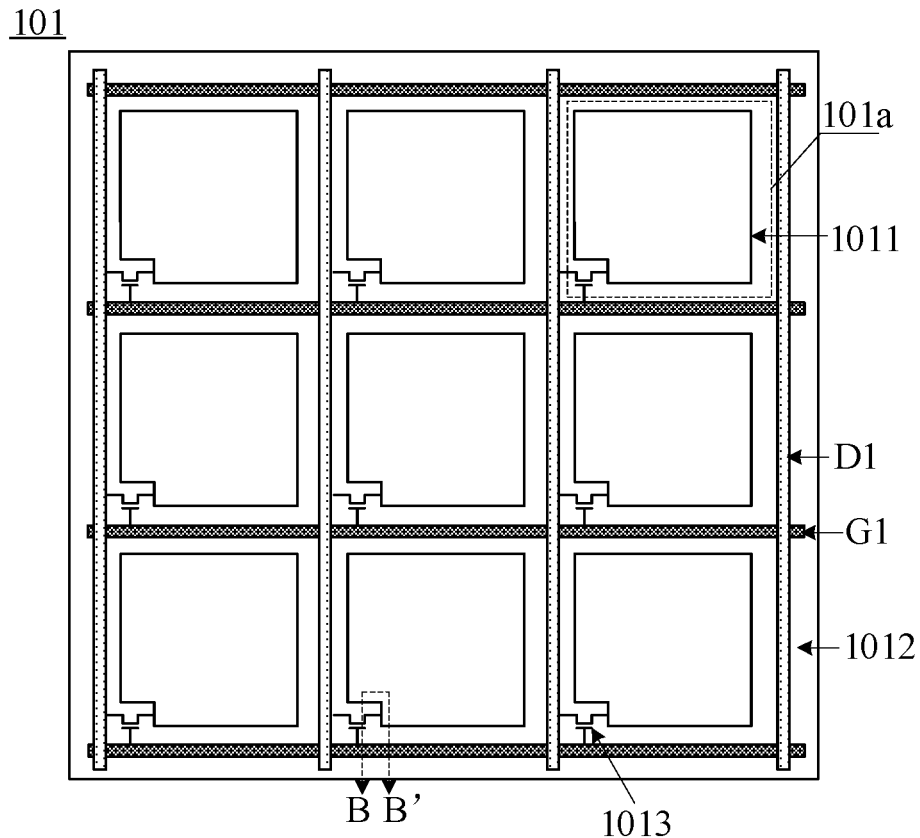
FIG. 9 is a top view of a first substrate according to some embodiments of the present disclosure.
Figure 10:
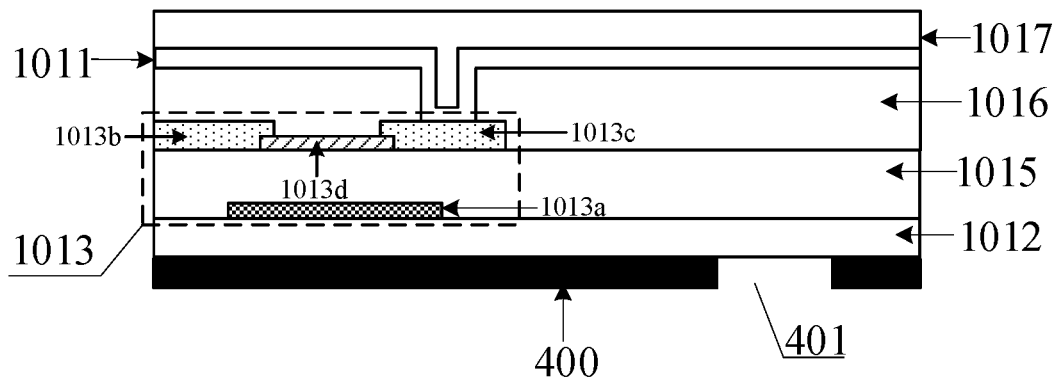
FIG. 10 is a schematic structural diagram of film layers of the first substrate shown in FIG. 9 at B-B'.

In some embodiments, referring to FIG. 9 and FIG. 10, FIG. 9 is a top view of a first substrate according to some embodiments of the present disclosure, and FIG. 10 is a schematic structural diagram of film layers of the first substrate shown in FIG. 9 at B-B'. The first substrate 101 in the liquid crystal panel 100 includes a first base substrate 1012, and the plurality of pixel electrodes 1011 and a plurality of driving thin-film transistors (TFTs) 1013 that are disposed on the first base substrate 1012. The plurality of pixel electrodes 1011 in the first substrate 101 are electrically connected to the plurality of driving TFTs 1013 in one-to-one correspondence.

In the embodiments of the present disclosure, there are many positions of the black matrix 400 in the liquid crystal handwriting board 000, and the embodiments of the present disclosure are illustrated in the implementation corresponding to the following two cases.

In a first case, as shown in FIG. 10, the black matrix 400 in the liquid crystal handwriting board 000 is disposed on a side, facing away from the second substrate 102, of the first base substrate 1012 in the first substrate 101.

Figure 11:
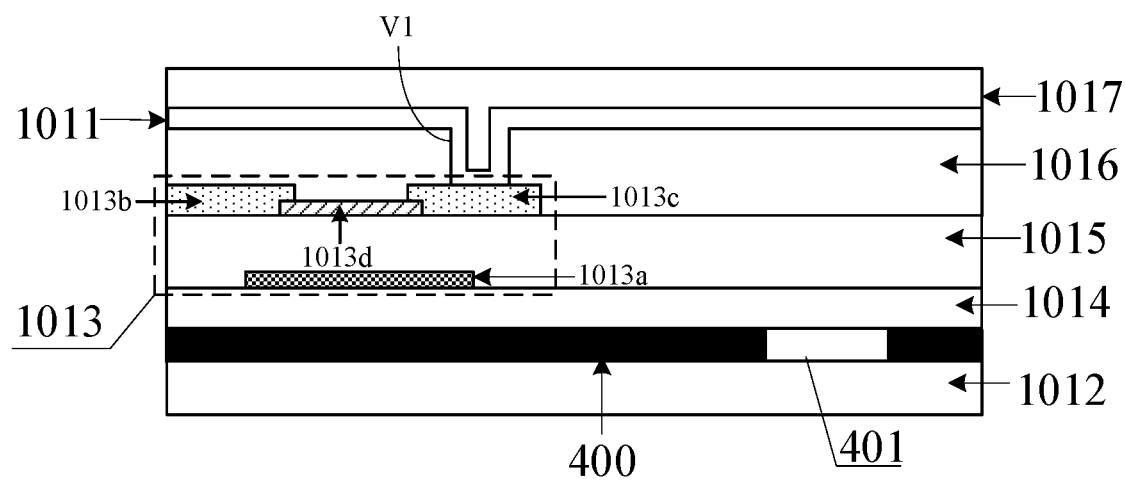
FIG. 11 is a schematic structural diagram of another film layers of the first substrate shown in FIG. 9 at B-B'.

In a second case, as shown in FIG. 11, FIG. 11 is a schematic structural diagram of another film layers of the first substrate shown in FIG. 9 at B-B'. The black matrix 400 in the liquid crystal handwriting board 000 is disposed on a side, facing towards the second substrate 102, of the first base substrate 1012 in the first substrate 101. In this case, as the black matrix 400 is conductive, a first insulative layer 1014 is disposed between the black matrix 400 and the plurality of driving TFTs 1013 to avoid the short circuit in the driving TFTs 1013 on the first base substrate 1012. Illustratively, the first insulative layer 1014 is a transparent insulative layer, such that the black matrix 400 is insulated from the driving TFT 1013 on the premise that the irradiation of the target line to the photosensitive assembly 200 through the light apertures 401 in the black matrix 400 is not affected.

In some embodiments of the present disclosure, the black matrix 400 in the above two cases is formed on the first base substrate 1012 by a screen printing process or a patterning process.

In the case that the black matrix 400 is formed on the first base substrate 1012 by the screen printing process, a layer of black ink is printed on the first base substrate 1012 by a screen printing device and is dried to acquire the black matrix 400.

In the case that the black matrix 400 is formed on the first base substrate 1012 by the patterning process, a black thin film is formed on the first base substrate 1012 by depositing, coating, sputtering, or the like, and is exposed and developed to acquire the black matrix 400.

In the embodiments of the present disclosure, as the black aluminum honeycomb panel in the liquid crystal handwriting board is replaced with the black matrix 400 in the liquid crystal handwriting board 000, and a thickness of the black matrix 400 is less than a thickness of the black aluminum honeycomb panel, a thickness and a weight of the liquid crystal handwriting board 000 in the embodiments of the present disclosure are less.

Figure 12:
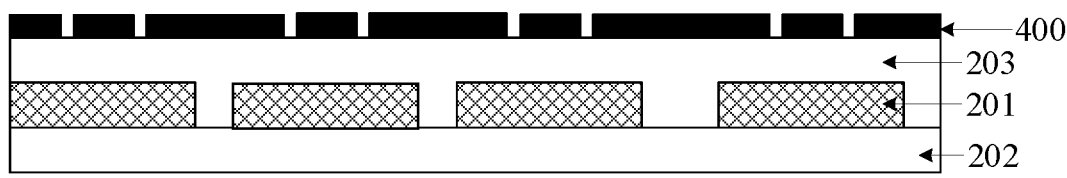
FIG. 12 is a schematic structural diagram of film layers of a photosensitive assembly according to some embodiments of the present disclosure.

It should be noted that the black matrix 400 in the liquid crystal handwriting board 000 can be integrated in the first substrate 101 or the photosensitive assembly 200. Illustratively, as shown in FIG. 12, FIG. 12 is a schematic structural diagram of film layers of a photosensitive assembly according to some embodiments of the present disclosure. The photosensitive assembly 200 further includes a planarization layer 203 on a side, distal from the circuit board 202, of the plurality of photosensitive elements 201, and the black matrix 400 in the liquid crystal handwriting board 000 is disposed on a side, distal from the circuit board 202, of the planarization layer 203. The planarization layer 203 is a transparent insulative layer, such that the planarization layer 203 improves a flatness of a side, facing towards the first substrate 101, of the photosensitive assembly, the flatness of the black matrix 400 is great, and the black matrix 400 is insulated from the photosensitive elements 201 on the premise that the irradiation of the target line to the photosensitive assembly 200 through the light apertures 401 in the black matrix 400 is not affected.

In some embodiments, as shown in FIG. 10 and FIG. 11, the driving TFT 1013 in the first substrate 101 includes a gate 1013a, a first electrode 1013b, a second electrode 1013c, and an active layer 1013d. In the driving TFT 1013, the first electrode 1013b and the second electrode 1013c are in lap with the active layer 1013d, and the active layer 1013d is insulated from the gate 1013a. For example, the active layer 1013d is insulated from the gate 1013a by a gate insulative layer 1015. It should be noted that the embodiments of the present disclosure are illustrated by taking the gate 1013a in the driving TFT 1013 being closer to the first base substrate 1012 than the active layer 1013d as an example. That is, the driving TFT 1013 is a bottom-gate TFT. In some embodiments, the driving TFT 1013 is a top-gate TFT, which is not limited in the embodiments of the present disclosure. It should be noted that the first electrode 1013b of the driving TFT 1013 is one of a source and a drain, and the second electrode 1013c is the other of the source and the drain.

In the embodiments of the present disclosure, as shown in FIG. 10 and FIG. 11, the first substrate 101 further includes a second insulative layer 1016 between the driving TFT 1013 and the pixel electrode 1011. The pixel electrode 1011 is disposed on the second insulative layer 1016, and the second insulative layer 1016 protects the driving TFT 1013 and improves the flatness of the pixel electrode 1011. In this case, a first via V1 is defined in the second insulative layer 1016, and the pixel electrode 1011 is electrically connected to the second electrode 1013c of the driving TFT through the first via V1.

The first substrate 101 further includes a third second insulative layer 1017 on a side, distal from the first base substrate 1012, of the pixel electrode 1011. In the case that the first substrate 101 is opposite to the second substrate 102, as a device environment is not a dust-free environment, foreign matter is present between the first substrate 101 and the second substrate 102. Thus, the third second insulative layer 1017 can avoid the foreign matter between the first substrate 101 and the second substrate 102 and conduct the pixel electrode 1011 in the first substrate 101 and the common electrode 1021 in the second substrate 102.

As shown in FIG. 9, the first substrate 101 further includes a first gate line G1 electrically connected to the gate 1013a of the driving TFT 1013 and a data signal line D1 electrically connected to the first electrode 1013b of the driving TFT 1013. Generally, a plurality of first gate lines G1 are defined, and the plurality of first gate lines G1 are parallel. A plurality of data signal lines D1 are defined, and the plurality of data signal lines D1 are parallel. An extension direction of the first gate line G1 is perpendicular to an extension direction of the data signal line D1, such that any two adjacent first gate lines G1 and any two adjacent data signal line D1 enclose a rectangular pixel region 101a.

In the embodiments of the present disclosure, the first gate line G1 and the data signal line D1 in the first substrate 101 are electrically connected to the control assembly 300, such that the control assembly 300 supplies the pixel voltage to the pixel electrode 1011 through the first gate line G1 and the data signal line D1.

Figure 13:
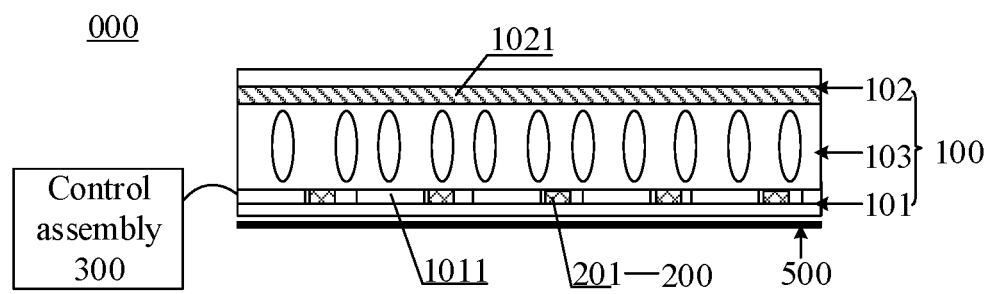
FIG. 13 is a schematic structural diagram of another liquid crystal handwriting board according to some embodiments of the present disclosure.

In a second optional implementation, referring to FIG. 13, FIG. 13 is a schematic structural diagram of another liquid crystal handwriting board according to some embodiments of the present disclosure. The photosensitive assembly 200 in the liquid crystal handwriting board 000 is integrated in the first substrate 101, such that the thickness of the liquid crystal handwriting board 000 is less without attaching the liquid crystal panel 100 in the liquid crystal handwriting board 000 to the photosensitive element including the circuit board.

In the embodiments of the present disclosure, the liquid crystal handwriting board 000 further includes a back film layer 500. The back film layer 500 is disposed on a side, distal from the second substrate 102, of the liquid crystal layer 103 in the liquid crystal panel 100. As such, the target light passes through the liquid crystal layer 103 and is absorbed by the black film layer 500 in the case that the bistable liquid crystal molecules in the liquid crystal handwriting board 000 are in the focal cone texture, such that the black background is displayed. It should be noted that the black film layer 500 and the black matrix 400 in the first optional implementation differ in that the light aperture is not required to be disposed in the black film layer 500. Thus, the position and forming manner of the black film layer 500 can be referred to the position and forming manner of the black matrix 400 in the first optional implementation, which are not repeated in the embodiments of the present disclosure.

Figure 14:
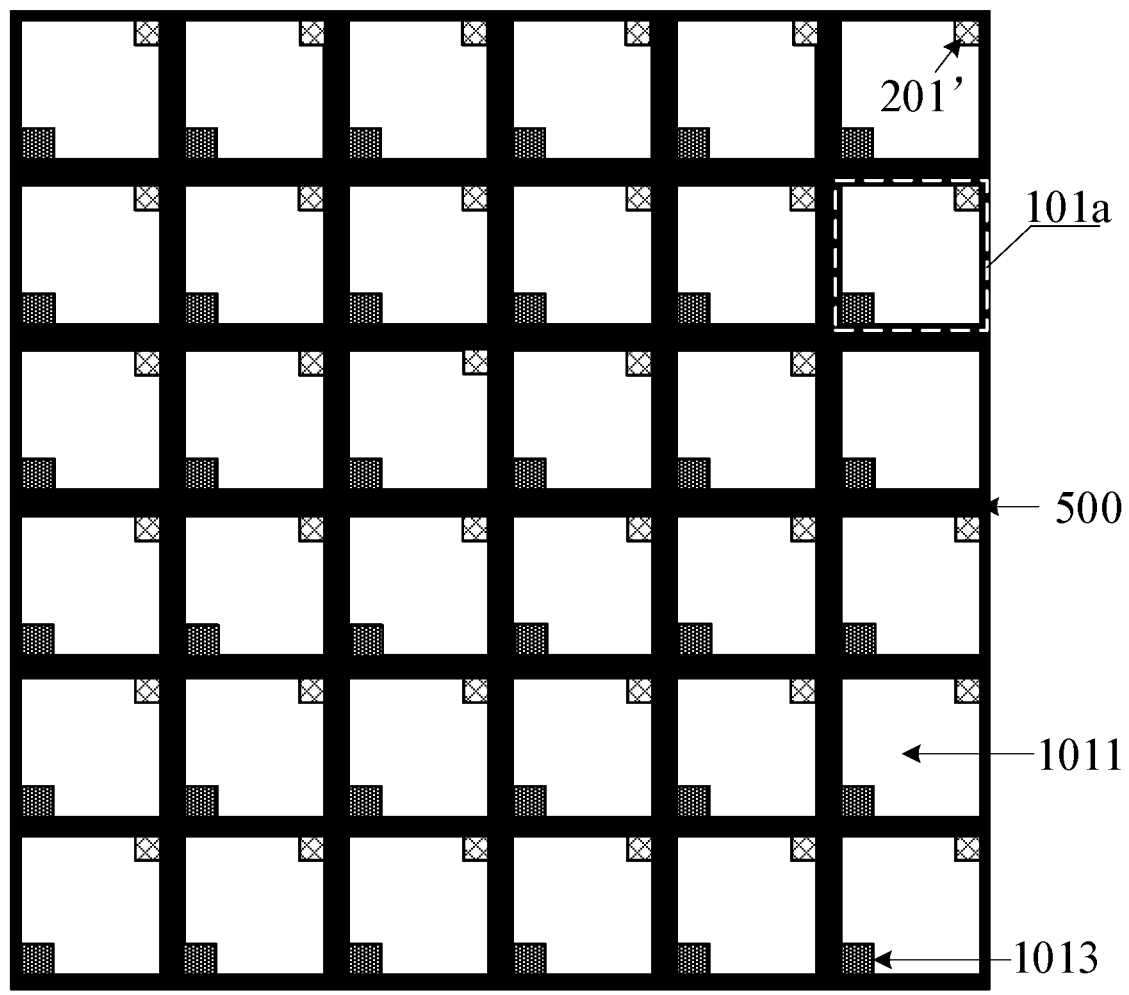
FIG. 14 is a top view of a first substrate and a black film layer that are laminated according to some embodiments of the present disclosure.

As shown in FIG. 14, FIG. 14 is a top view of a first substrate and a black film layer that are laminated according to some embodiments of the present disclosure. As the first substrate 101 is generally a substrate integrated with a plurality of driving TFTs 1013 arranged in the array, the photosensitive element 201 is determined as a photosensitive TFT capable of detecting the target light to ensure that the photosensitive assembly 200 is integrated in the first substrate 101. That is, the photosensitive elements 201 in the photosensitive assembly 200 are the photosensitive TFTs 201'.

In the embodiments of the present disclosure, a plurality of photosensitive TFTs 201' in the first substrate 101 are in one-to-one correspondence to the plurality of pixel regions 101a, and each photosensitive TFT 201' is within the corresponding pixel region 101a.

In this case, the target light irradiated to the pixel regions 101a in the first substrate 101 in the liquid crystal panel 100 is sensed by the photosensitive TFT 201' in the pixel region 101a, such that the photosensitive assembly 200 senses the target light irradiated to any pixel region 101a by the plurality of photosensitive TFTs 201'. In addition, in the case that the target light irradiated to the pixel region 101a is sensed by a single photosensitive TFTs 201', the light intensity of the target line is not required to be great. As such, the light intensity of the target line is slightly greater than the light intensity of the ambient line, such that the target light irradiated to any pixel region 101a does not affect the normal operation of the driving TFT 1013.

Figure 15:
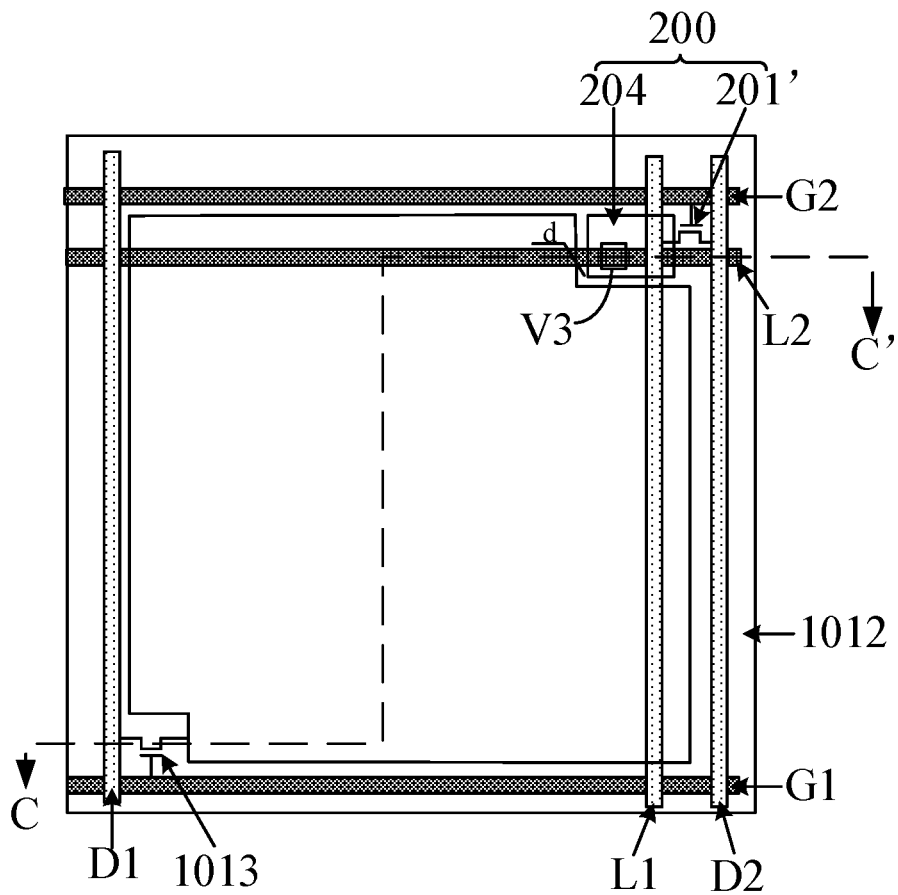
FIG. 15 is a top view of a pixel region in a first substrate according to some embodiments of the present disclosure.
Figure 16:
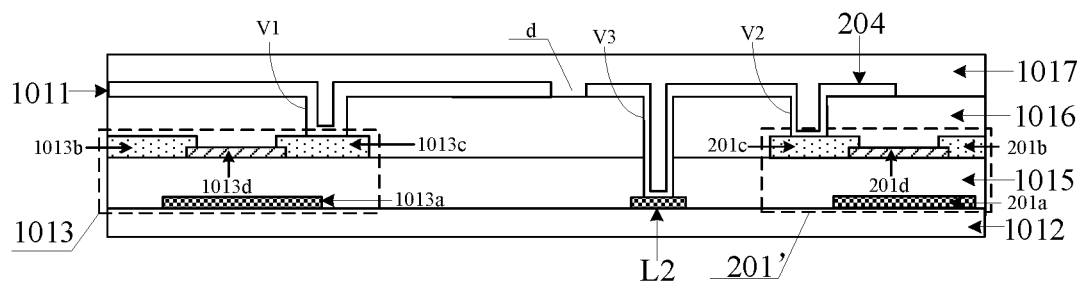
FIG. 16 is a schematic structural diagram of film layers of the first substrate shown in FIG. 15 at C-C'.

In the embodiments of the present disclosure, as shown in FIG. 15 and FIG. 16, FIG. 15 is a top view of a pixel region in a first substrate according to some embodiments of the present disclosure, and FIG. 16 is a schematic structural diagram of film layers of the first substrate shown in FIG. 15 at C-C'. The first substrate 101 includes a first base substrate 1012, and the plurality of pixel electrodes 1011 and a plurality of driving TFTs 1013 that are disposed on the first base substrate 1012. It should be noted that the connection manner of the pixel electrode 1011 and the driving TFT 1013 in the first substrate 101 and other structures in the first substrate 101 can be referred to the corresponding description in the first optional implementation, which are not repeated in the embodiments of the present disclosure. For simplification of the manufacturing process of the first substrate 101, the driving TFT 1013 and the photosensitive TFT 201' in the first substrate 101 are disposed in the same layer. That is, in manufacturing the first substrate 101, the driving TFT 1013 and the photosensitive TFT 201' are formed simultaneously.

Illustratively, the photosensitive TFT 201' includes a gate 201*a*, a first electrode 201*b*, a second electrode 201*c*, and an active layer 201*d*. In the photosensitive TFT 201', the first electrode 201*b* and the second electrode 201*c* are in lap with the active layer 201*d*, and the active layer 201*d* is insulated from the gate 201*a*. For example, the active layer 201*d* is insulated from the gate 201*a* by a gate insulative layer 1015. It should be noted that the first electrode 201*b* of the photosensitive TFT 201' is one of a source and a drain, and the second electrode 201*c* is the other of the source and the drain.

In this case, the gate 201*a* of the photosensitive TFT 201' and the gate 1013*a* of the driving TFT 1013 are formed by a one patterning process, the first electrode 201*b* and the second electrode 201*c* of the photosensitive TFT 201' and the first electrode 1013*b* and the second electrode 1013*c* of the driving TFT 1013 are formed by a one patterning process, and the active layer 201*d* of the photosensitive TFT 201' and the active layer 1013*d* of the driving TFT 1013 are formed by a one patterning process. It should be noted that the one patterning process in the embodiments of the present disclosure is photoresist coating, exposing, developing, etching, and photoresist removing.

In some embodiments, as shown in FIG. 15, the photosensitive assembly 200 further includes a photosensitive signal line D2 electrically connected to the first electrode 201*b* of the photosensitive TFT 201', and a first sensing line L1 and a second sensing line L2 that are electrically connected to the second electrode 201*c* of the photosensitive TFT 201'. The control assembly 200 in the liquid crystal handwriting board 000 is electrically connected to the photosensitive signal line D2, the first sensing line L1, and the second sensing line L2, an extension direction of the first sensing line L1 is perpendicular to an extension direction of the second sensing line L2, and the extension direction of the first sensing line L1 is parallel to an extension direction of the photosensitive signal line D2.

In the embodiments of the present disclosure, a plurality of photosensitive signal lines D2, a plurality of first sensing lines L1, and a plurality of second sensing lines L2 are defined in the control assembly 200. The plurality of photosensitive TFTs 201' are arranged in an array, each photosensitive signal line D2 is electrically connected to the first electrodes 201*b* of one column of photosensitive TFTs 201', each first sensing line L1 is electrically connected to the second electrodes 201*c* of one column of photosensitive TFTs 201', and each second sensing line L2 is electrically connected to the second electrodes 201*c* of one row of photosensitive TFTs 201'. As such, each two first sensing line L1 and second sensing line L2 that are intersected is electrically connected to the second electrodes 201*c* of the same photosensitive TFT 201' at the intersection position.

In this case, in the case that the photosensitive assembly 200 is in an operation state, the control assembly simultaneously supplies an electric signal to the photosensitive signal line D2. In the case that no target light is irradiated, the first electrode 201*b* and the second electrode 201*c* of the photosensitive TFT 201' are not conducted, such that the electric signal supplied to the photosensitive signal line D2 is not transmitted to the first sensing line L1 and second sensing line L2. In the case that the target light is irradiated, a number of hole-electron pairs in the active layer 201*d* of the photosensitive TFT 201' is increased, such that a leakage current in the photosensitive TFT 201' is increased, the first electrode 201*b* and the second electrode 201*c* of the photosensitive TFT 201' are conducted, and the electric signal supplied to the photosensitive signal line D2 is transmitted to the first sensing line L1 and second sensing line L2. In addition, the first sensing line L1 and second sensing line L2 are electrically connected to the control assembly 300. As such, the control assembly 300 can positioning the photosensitive TFT 201' of the sensed target light by sensing a change in a current of the first sensing line L1 and a change in a current of the second sensing line L2, such that the position of the target light irradiated to the pixel region 101*a* is further determined.

In some embodiments, the photosensitive assembly 200 further includes a second gate line G2 electrically connected to the gate 201*a* of the photosensitive TFT 201'. The second gate line G2 is electrically connected to the control assembly 300, and an extension direction of the second gate line G2 is parallel to the extension direction of the second sensing line L2. In the case that the photosensitive assembly 200 is in the operation state, the control assembly 300 supplies a gate voltage to the gate 201*a* of the photosensitive TFT 201' through the second gate line G2, and the gate voltage is less. In the case that no target light is irradiated, the gate voltage supplied to the gate 201*a* of the photosensitive TFT 201' does not control the first electrode 201*b* and the second electrode 201*c* of the photosensitive TFT 201' to be conducted. By supplying a less gate voltage to the gate 201*a* of the photosensitive TFT 201' through the second gate line G2, the first electrode 201*b* and the second electrode 201*c* of the photosensitive TFT 201' are conducted in the case that the target light is irradiated to the photosensitive TFT 201'.

In the embodiments of the present disclosure, for simplification of the manufacturing difficulty of the first substrate 101, the data signal line D1, the photosensitive signal line D2, and the first sensing line L1 in the first substrate 101 are disposed in the same layer, that is, a source and drain metal layer including the data signal line D1, the photosensitive signal line D2, and the first sensing line L1 is formed by a one patterning process. In addition, the first gate line G1, the second gate line G2, and the second sensing line L2 in the first substrate 101 are disposed in the same layer, that is, a gate metal layer including the first gate line G1, the second gate line G2, and the second sensing line L2 is formed in a one patterning process. The source and drain metal layer further includes a first electrode and a second electrode of the TFT integrated in the first substrate 101, and the gate metal layer further includes a gate of the TFT integrated in the first substrate 101.

In this case, as shown in FIG. 16, the photosensitive signal line D2 is electrically connected to the first electrode 201*b* of the photosensitive TFT 201', and the first sensing line L1 is electrically connected to the second electrode 201*c* of the photosensitive TFT 201'. A gate insulative layer 1015 is disposed between the gate metal layer and the source and drain metal layer in the first substrate 101, and a connecting electrode is configured to connect the second sensing line L2 and the second electrode 201*c* of the photosensitive TFT 201' to ensure that the second sensing line L2 is electrically connected to the second electrode 201*c* of the photosensitive TFT 201'.

In some embodiments, the photosensitive assembly 200 further includes a connecting electrode 204 in a same layer as the pixel electrode 1011, and the connecting electrode 204 is electrically connected to the second electrode 201*c* of the photosensitive TFT 201' and the second sensing line L2. For example, the second insulative layer 1016 in the first substrate 101 includes a second via V2, and a conducted third via V3 is defined in the gate insulative layer 1015 and the second insulative layer 1016 in the first substrate 101. As such, the connecting electrode 204 is electrically connected to the second electrode 201c of the photosensitive TFT 201' through the second via V2, and is electrically connected to the second sensing line L2 through the third via V3.

It should be noted that the pixel electrode 1011 and the connecting electrode 204 are formed by a one patterning process, and the pixel electrode 1011 is insulated from the connecting electrode 204 by a slit d.

In some embodiments, for a less number of lines in the first substrate 101, the data signal line D1 and the photosensitive signal line D2 in the first substrate 101 are shared. In this case, the first electrode 201b of the photosensitive TFT 201' and the second electrode 1013c of the driving TFT 1013 are connected to the same data line. The control assembly 300 drives the photosensitive TFT 201' and the driving TFT 1013 to operate in a staged manner. For example, each driving period includes a first sub-period and a second sub-period. In the first sub-period, the control assembly 300 supplies a first driving signal to the data line to ensure that the photosensitive TFT 201' operates, such that the irradiation position of the target light is determined. In the second sub-period, the control assembly 300 supplies a second driving signal to the data line to ensure that the driving TFT 1013 operates, such that the pixel voltage is supplied to the pixel electrode 1011 in the pixel region for erasure.

In the embodiments of the present disclosure, the active layer 201d in the photosensitive TFT 201' includes a channel region, and the channel region is a region, disposed between a region of the active layer 201d in contact with the first electrode 201b and a region of the active layer 201d in contact with the second electrode 201c, of the active layer 201d. The channel region in the active layer 201d in the photosensitive TFT 201' is a "-" shaped channel region, a U-shaped channel region, or a L-shaped channel region. In the present disclosure, a ratio of a long side to a short side of the channel region in the active layer 201d ranges from (4-10)/(2.5-6). For example, the ratio of the long side to the short side of the channel region in the active layer 201d is 5/4. It should be noted that the structure of the driving TFT 1013 in the first substrate is the same as the structure of the photosensitive TFT 201'. That is, the channel region in the active layer 1013d in the driving TFT 1013 is a "-" shaped channel region, a U-shaped channel region, or a L-shaped channel region.

Figure 17:
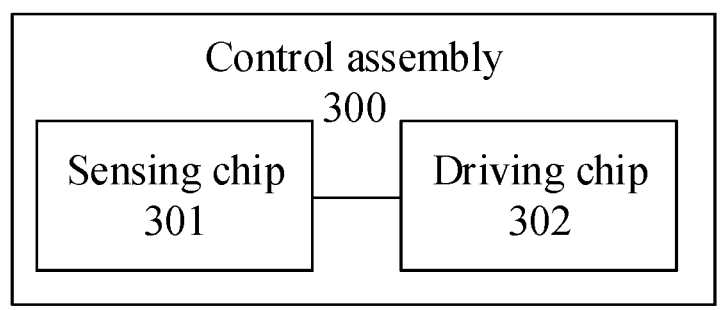
FIG. 17 is a structural block diagram of a control assembly according to some embodiments of the present disclosure.

In conjunction with the above two optional implementations, referring to FIG. 17, FIG. 17 is a structural block diagram of a control assembly according to some embodiments of the present disclosure. The control assembly 300 includes a sensing chip 301 and a driving chip 302. The sensing chip 301 is electrically connected to the driving chip 302. The driving chip 302 in the control assembly 300 is electrically connected to the first substrate 101 in the liquid crystal panel 100, and the sensing chip 301 in the control assembly 300 is electrically connected to the photosensitive assembly 200. The sensing chip 301 determines a position of the photosensitive element 201 sensing the target light in the plurality of photosensitive elements 201 by the photosensitive assembly 200, such that the position information of the pixel region for erasure is determined. Then, the sensing chip 301 transmits the position information of the pixel region for erasure to the driving chip 302, such that the driving chip 302 supplies the pixel voltage to the pixel electrode in the pixel region for erasure.

For the electric connection of the control assembly 300 and the first substrate 101, and the electric connection of the control assembly 300 and the photosensitive assembly 200, as the structure of the photosensitive assembly 200 includes two optional implementations, the embodiments of the present disclosure are illustrated in the following two cases.

In a first case, in the case that the structure of the photosensitive assembly 200 is the structure shown in the first optional implementation, the sensing chip 301 in the control assembly 300 is electrically connected to the circuit board 202 in the photosensitive assembly 200, and the driving chip 302 in the control assembly 300 is electrically connected to the first gate line G1 and the data signal line D1 in the first substrate 101.

In a second case, in the case that the structure of the photosensitive assembly 200 is the structure shown in the second optional implementation, the sensing chip 301 in the control assembly 300 is electrically connected to the first sensing line L1 and the second sensing line L2 in the photosensitive assembly 200, the driving chip 302 in the control assembly 300 is electrically connected to the first gate line G1 and the data signal line D1 in the first substrate 101, and the driving chip 302 is further electrically connected to the second gate line G2 and the photosensitive signal line D2 in the photosensitive assembly 200.

Figure 18:
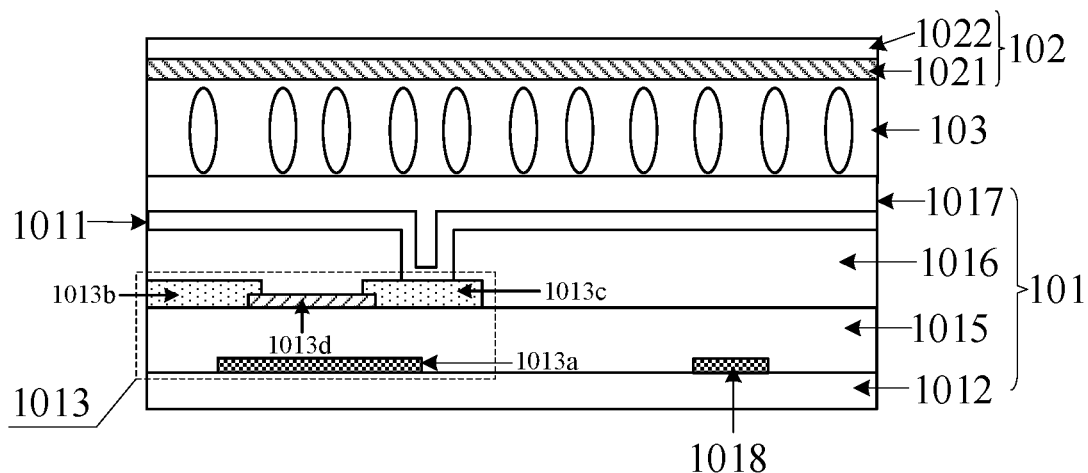
FIG. 18 is a schematic structural diagram of film layers of a liquid crystal panel according to some embodiments of the present disclosure.
Figure 19:
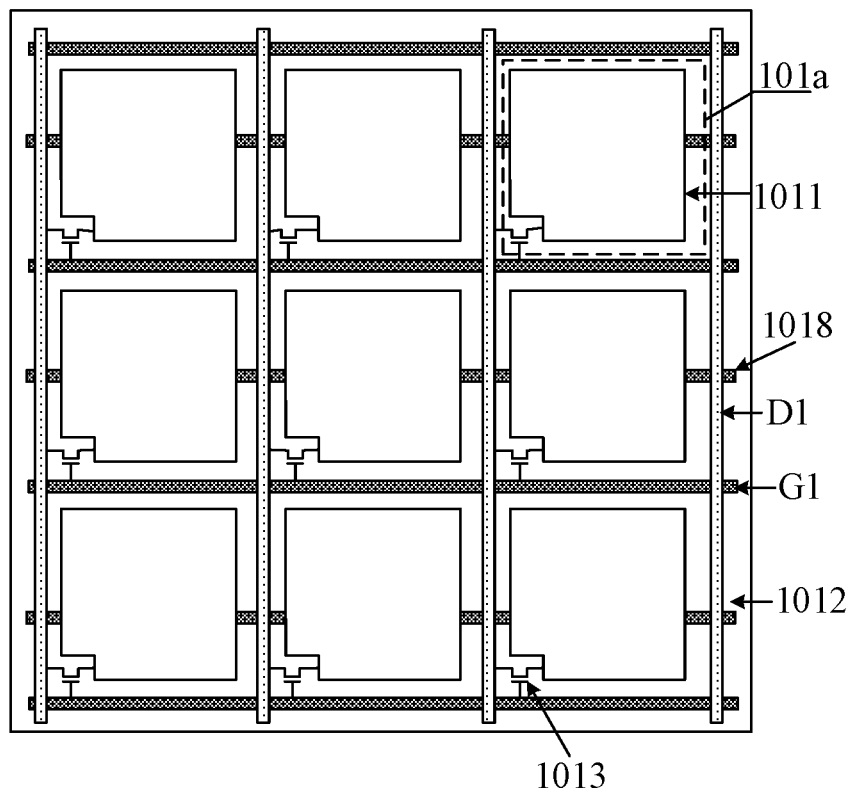
FIG. 19 is a top view of the first substrate in the liquid crystal panel shown in FIG. 18.

In the present disclosure, as shown in FIG. 18 and FIG. 19, FIG. 18 is a schematic structural diagram of film layers of a liquid crystal panel according to some embodiments of the present disclosure, and FIG. 19 is a top view of the first substrate in the liquid crystal panel shown in FIG. 18. The first substrate 101 in the liquid crystal handwriting board 000 further includes an auxiliary electrode line 1018 on the first base substrate 1012. The auxiliary electrode line 1018 and the first gate line G1 are disposed in the same layer, and an extension direction of the auxiliary electrode line 1018 and an extension direction of the first gate line G1 are the same.

Illustratively, the pixel electrodes 1011 in the first substrate 101 are arranged in a plurality of rows, and a number of the auxiliary electrode lines 1018 in the first substrate 101 is equal to a number of rows of the pixel electrodes 1011. An orthogonal projection of each auxiliary electrode line 1018 on the first base substrate 1012 is overlapped with an orthogonal projection of the corresponding row of pixel electrodes 1011 on the first base substrate 1012, and the auxiliary electrode line 1018 and each pixel electrode 1011 in the row of pixel electrodes 1011 from a storage capacitor Cst. The storage capacitor Cst is used to maintain the pixel voltage of the pixel electrode 1011. Thus, in the case that the liquid crystal handwriting board 000 is erased, the storage capacitor Cst avoids that a change of the voltage of the pixel electrode 1011 in the pixel region for erasure affects the voltages of the surrounding pixel electrode 1011, and thus avoids the effect on the display effect of the pixel region surrounding the pixel region for erasure.

In some embodiments, the second substrate 102 in the liquid crystal panel 100 includes a second base substrate 1022 and a common electrode 1021 on the second base substrate 1022 in the second substrate 102. A constant common voltage (for example, 0 V) is supplied on the common electrode 1021, such that a voltage difference is present between the pixel electrode 1011 and the common electrode 1021 in the case that the pixel voltage is supplied on the pixel electrode 1011. The second base substrate 1022 is a flexible base substrate, and the second base substrate 1022 is made of Polyethylene Terephthalate (PET).

In the embodiments of the present disclosure, the pixel electrode 1011 in the first substrate 101 and the common electrode 1021 in the second substrate 102 are made of indium tin oxide (ITO), indium zinc oxide (IZO), or other transparent conductive materials, such that the target light is irradiated to the photosensitive assembly 200 upon passing through the liquid crystal panel 100.

In summary, the liquid crystal handwriting board in the embodiments of the present disclosure includes: a liquid crystal panel, a photosensitive assembly, and a control assembly. In the case that handwriting displayed on the liquid crystal handwriting board requires to be erased, an erasing tool capable of emitting target light erases the handwriting. As an orthogonal projection of a photosensitive element in the photosensitive assembly on a first substrate of the liquid crystal panel is at least partially overlapped with the corresponding pixel region, the photosensitive assembly determines a position of target light irradiated to the liquid crystal panel by detecting the target light by at least a part of photosensitive elements upon emission of the target light to the liquid crystal panel by the erasing tool, and the position of target light irradiated to the liquid crystal panel is a position of a pixel region for erasure. As such, the liquid crystal handwriting board supplies a pixel voltage to pixel electrodes in the pixel region for erasure by the control assembly, such that the erasure of the handwriting in the pixel region for erasure is achieved. In this case, even if a hand of a user is in contact with the liquid crystal handwriting board in writing, the photosensitive assembly does not determine a region in which the user is in contact with the liquid crystal handwriting board as the pixel region for erasure, such that a possibility of false erasure in the liquid crystal handwriting board is reduced, and an effect of locally erasing the liquid crystal handwriting board is efficiently improved.

Figure 20:
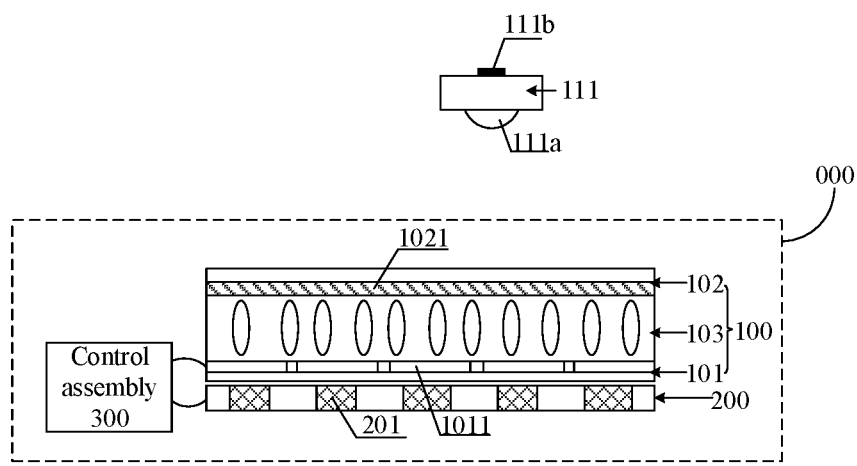
FIG. 20 is a schematic structural diagram of a handwriting system according to some embodiments of the present disclosure.

The embodiments of the present disclosure further provide a handwriting system. Referring to FIG. 20, FIG. 20 is a schematic structural diagram of a handwriting system according to some embodiments of the present disclosure. The handwriting system includes an erasing tool 111 and a liquid crystal handwriting board 000. The liquid crystal handwriting board 000 is the liquid crystal handwriting board in the above embodiments, for example, the liquid crystal handwriting board shown in FIG. 4, FIG. 5, or FIG. 13. The erasing tool 111 includes a light-emitting assembly 111*a* configured to emit the target light. A light intensity of the target light emitted by the light-emitting assembly 111*a* requires to be much greater than a light intensity of the ambient light, such that the photosensitive assembly 200 in the liquid crystal handwriting board 000 distinguishes the target light and the ambient light. The target light emitted by the light-emitting assembly 111*a* is light of colors other than the green light to ensure that the target light is not reflected by the bistable liquid crystal molecules in the planar texture.

In the embodiments of the present disclosure, the liquid crystal handwriting board 000 is configured to determine position information of the pixel region for erasure by detecting position information of target light by the photosensitive assembly 200 upon emission of the target light to the liquid crystal panel 100 by the light-emitting assembly 111*a* of the erasing tool 111.

Illustratively, in the case that the handwriting displayed on the liquid crystal handwriting board 000 requires to be erased, the light-emitting assembly 111*a* of the erasing tool 111 emits the target light to the pixel region for erasure in the liquid crystal panel 100, and then the liquid crystal handwriting board 000 detects the position information of target light irradiated to the liquid crystal panel 100 by the photosensitive assembly 200. As such, the control assembly 300 in the liquid crystal handwriting board 000 determines the position information of the pixel region for erasure by detecting the position information of the target light by the photosensitive assembly 200, and supplies the pixel voltage to the pixel electrodes in the pixel region for erasure based on the position information of the pixel region for erasure, such that the handwriting in the pixel region for erasure is erased.

Figure 21:
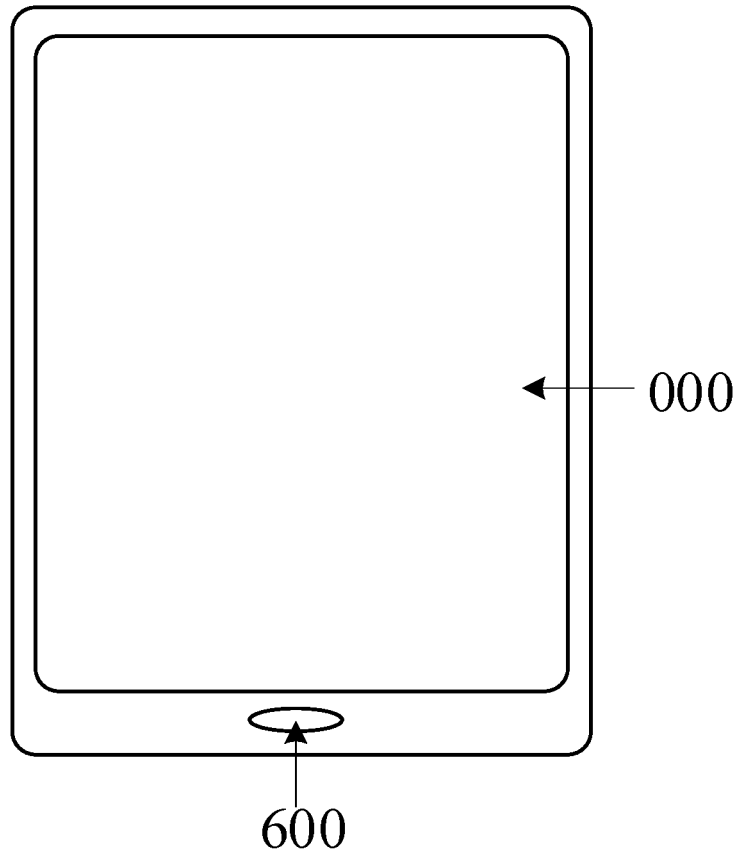
FIG. 21 is a schematic structural diagram of a liquid crystal handwriting board according to some embodiments of the present disclosure.

In some embodiments, referring to FIG. 21, FIG. 21 is a schematic structural diagram of a liquid crystal handwriting board according to some embodiments of the present disclosure. For less power consumption of the liquid crystal handwriting board 000, a switch 600 is disposed in the liquid crystal handwriting board 000. The switch 600 is electrically connected to the control assembly 300, and is configured to control the switch of the liquid crystal handwriting board 000 between an erasing mode and a writing mode. In the case that the liquid crystal handwriting board 000 is in the writing mode, the control assembly 300 and the photosensitive assembly 200 are in a non-operation state. In this case, the liquid crystal handwriting board 000 does not require to power the control assembly 300 and the photosensitive assembly 200. In the case that the liquid crystal handwriting board 000 is in the erasing mode, the control assembly 300 and the photosensitive assembly 200 are in an operation state. In this case, the liquid crystal handwriting board 000 requires to power the control assembly 300 and the photosensitive assembly 200. As such, the liquid crystal handwriting board 000 consumes the electric energy only in the erasing mode 000, and the power consumption of the liquid crystal handwriting board 000 is efficiently reduced.

In the embodiments of the present disclosure, as shown in FIG. 21, the erasing tool 111 in the handwriting system is further provided with a switch button 111*b*, and the user controls the light-emitting assembly 111*a* of the erasing tool 111 to emit or stop emitting the target light by pressing the switch button 111*b* of the erasing tool 111.

Figure 22:
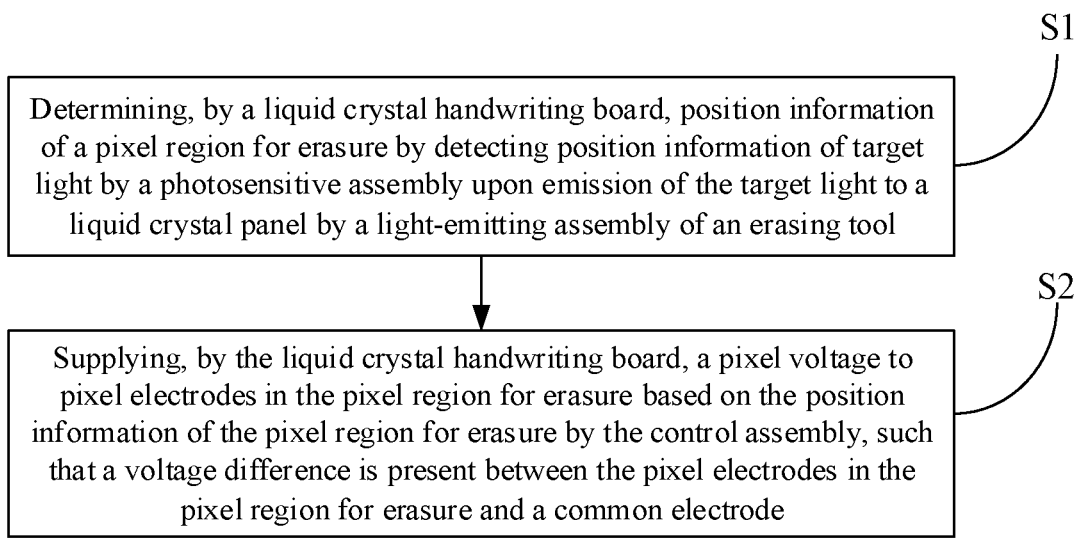
FIG. 22 is a flow chart of a method for controlling a handwriting system according to some embodiments of the present disclosure.

The embodiments of the present disclosure further provide a method for controlling a handwriting system. Referring to FIG. 22, FIG. 22 is a flow chart of a method for controlling a handwriting system according to some embodiments of the present disclosure. The method for controlling the handwriting system is applicable to the handwriting system in the above embodiments, for example, the handwriting system shown in FIG. 20 or FIG. 21. The method for controlling the handwriting system includes the following processes.

In S1, the liquid crystal handwriting board determines position information of a pixel region for erasure by detecting position information of target light by the photosensitive assembly upon emission of the target light to the liquid crystal panel by the light-emitting assembly of the erasing tool In S2, the liquid crystal handwriting board supplies a pixel voltage to the pixel electrodes in the pixel region for erasure based on the position information of the pixel region for erasure by the control assembly, such that a voltage difference is present between the pixel electrodes in the pixel region for erasure and the common electrode.

Those skilled in the field may clearly understand, for the convenience and simplicity of description, the specific operation principle of the above method for controlling the handwriting system can be referred to the corresponding description of the structure of the handwriting system and the structural of the liquid crystal handwriting panel in the above embodiments, which are repeated herein.

It should be noted that in the accompanying drawings, the sizes of the layers and regions may be scaled up for clarity of the illustration. It can be understood that when an element or layer is described as being "above" another element or layer, the described element or layer may be directly on the other element or layer, or an intermediate layer may exist. In addition, it can be understood that when an element or layer is described as being "below" another element or layer, the described element or layer may be directly below the other element or layer, or more than one intermediate layer or element may exist. In addition, it can also be understood that when a layer or element is described as being arranged "between" two layers or elements, the described layer or element may be the only layer between the two layers or elements, or more than one intermediate layer or element may exist. In the whole description, like reference numerals denote like elements.

In the present disclosure, the terms "first" and "second" are configured for descriptive purposes only and are not to be construed as indicating or implying relative importance. The term "a plurality of" refers to two or more, unless specifically defined otherwise.

Described above are merely exemplary embodiments of the present disclosure, and are not intended to limit the present disclosure. Any modifications, equivalent substitutions, improvements, and the like within the spirit and principles of the disclosure are included in the scope of protection of the present disclosure.

The invention claimed is:

1. A liquid crystal handwriting board, comprising: a liquid crystal panel, a photosensitive assembly, and a control assembly; wherein
    the liquid crystal panel comprises a first substrate and a second substrate that are opposite, wherein the first substrate comprises a plurality of pixel regions and a plurality of pixel electrodes in the plurality of pixel regions, and the second substrate comprises a common electrode;
    the photosensitive assembly comprises a plurality of photosensitive elements, wherein one of the plurality of photosensitive elements corresponds to at least one of the plurality of pixel regions, and an orthogonal projection of each of the plurality of photosensitive elements on the first substrate is at least partially overlapped with the corresponding at least one of the plurality of pixel regions; and
    the control assembly is electrically connected to the liquid crystal panel and the photosensitive assembly, and is configured to determine position information of a pixel region for erasure by detecting position information of target light irradiated to the liquid crystal panel by the photosensitive assembly and supply a pixel voltage to the plurality of pixel electrodes in the pixel region for erasure, such that a voltage difference is present between the plurality of pixel electrodes in the pixel region for erasure and the common electrode,
    wherein the photosensitive assembly is disposed on a side, distal from the second substrate, of the first substrate,
    the liquid crystal handwriting board further comprising:
    a black matrix, wherein the black matrix is disposed between the plurality of pixel electrodes and the plurality of photosensitive elements, and a plurality of light apertures are defined in the black matrix, wherein the plurality of light apertures are in one-to-one correspondence to the plurality of pixel regions, an orthogonal projection of each of the plurality of light apertures on the first substrate is within the corresponding pixel region, each of the plurality of photosensitive elements corresponds to at least one of the plurality of light apertures, and the orthogonal projection of each of the plurality of light apertures on the first substrate is at least partially overlapped with an orthogonal projection of the corresponding photosensitive element on the first substrate.

2. The liquid crystal handwriting board according to claim 1, wherein in a target direction, in at least two light apertures corresponding to at least two adjacent pixel regions, an arrangement direction of any two adjacent light apertures in the at least two light apertures is intersected with the target direction, and the target direction is an arrangement direction of one row of pixel regions.

3. The liquid crystal handwriting board according to claim 2, wherein the plurality of light apertures comprise at least one set of light apertures, wherein positions of orthogonal projections of the light apertures in each of the at least one set of light apertures on the first substrate in the corresponding pixel region are different.

4. The liquid crystal handwriting board according to claim 1, wherein the first substrate comprises a first base substrate, and the plurality of pixel electrodes and a plurality of driving thin-film transistors (TFTs) that are disposed on the first base substrate, wherein the plurality of pixel electrodes are electrically connected to the plurality of driving TFTs in one-to-one correspondence; wherein
    the black matrix is disposed on a side, facing away from the second substrate, of the first base substrate; or
    the black matrix is disposed on a side, facing towards the second substrate, of the first base substrate, and the first substrate further comprises a first insulative layer between the black matrix and the plurality of driving TFTs.

5. The liquid crystal handwriting board according to claim 1, wherein a proportion of an area of the orthogonal projection of each of the plurality of light apertures on the first substrate based on an area of the corresponding pixel region ranges from 5% to 20%.

6. The liquid crystal handwriting board according to claim 1, wherein the photosensitive assembly comprises a circuit board and the plurality of photosensitive elements on the circuit board, wherein the plurality of photosensitive elements are electrically connected to the circuit board, and the circuit board is electrically connected to the control assembly.

7. The liquid crystal handwriting board according to claim 1, wherein the photosensitive assembly is integrated in the first substrate, the photosensitive assembly is a photosensitive thin-film transistor (TFT), a plurality of photosensitive TFTs are in one-to-one correspondence to the plurality of pixel regions, and each of the plurality of photosensitive TFTs is within the corresponding pixel region.

8. The liquid crystal handwriting board according to claim 7, wherein the photosensitive assembly further comprises a photosensitive signal line electrically connected to a first electrode of each of the plurality of photosensitive TFTs, and a first sensing line and a second sensing line that are electrically connected to a second electrode of each of the plurality of photosensitive TFTs, wherein the control assembly is electrically connected to the photosensitive signal line, the first sensing line, and the second sensing line, and an extension direction of the first sensing line is perpendicular to an extension direction of the second sensing line.

9. The liquid crystal handwriting board according to claim 8, wherein the photosensitive assembly further comprises a connecting electrode in a same layer as the plurality of pixel electrodes, wherein the connecting electrode is electrically connected to the second electrode of each of the plurality of photosensitive TFTs and the second sensing line.

10. The liquid crystal handwriting board according to claim 9, wherein the first substrate comprises a first base substrate, and the plurality of pixel electrodes and a plurality of driving TFTs that are disposed on the first base substrate, wherein the plurality of pixel electrodes are electrically connected to the plurality of driving TFTs in one-to-one correspondence, and the plurality of driving TFTs and the plurality of photosensitive TFTs are disposed in the same layer.

11. The liquid crystal handwriting board according to claim 1, further comprising: a bistable liquid crystal molecule layer between the first substrate and a second substrate, wherein bistable liquid crystal molecules in the bistable liquid crystal molecule layer are configured to: transform from a focal cone texture to a planar texture in the case that an external pressure is supplied on the liquid crystal panel, and transform from the planar texture to the focal cone texture in the case that the voltage difference is present between the plurality of pixel electrodes in the pixel region for erasure and the common electrode.

12. A handwriting system, comprising: an erasing tool and a liquid crystal handwriting board; wherein
the liquid crystal handwriting board comprises: a liquid crystal panel, a photosensitive assembly, and a control assembly; wherein
the liquid crystal panel comprises a first substrate and a second substrate that are opposite, wherein the first substrate comprises a plurality of pixel regions and a plurality of pixel electrodes in the plurality of pixel regions, and the second substrate comprises a common electrode;
the photosensitive assembly comprises a plurality of photosensitive elements, wherein one of the plurality of photosensitive elements corresponds to at least one of the plurality of pixel regions, and an orthogonal projection of each of the plurality of photosensitive elements on the first substrate is at least partially overlapped with the corresponding at least one of the plurality of pixel regions; and
the control assembly is electrically connected to the liquid crystal panel and the photosensitive assembly, and is configured to determine position information of a pixel region for erasure by detecting position information of target light irradiated to the liquid crystal panel by the photosensitive assembly and supply a pixel voltage to the plurality of pixel electrodes in the pixel region for erasure, such that a voltage difference is present between the plurality of pixel electrodes in the pixel region for erasure and the common electrode;
and the erasing tool comprises a light-emitting assembly, and the liquid crystal handwriting board is configured to determine the position information of the pixel region for erasure by detecting the position information of the target light by the photosensitive assembly upon emission of the target light to the liquid crystal panel by the light-emitting assembly of the erasing tool,
wherein the photosensitive assembly is disposed on a side, distal from the second substrate, of the first substrate, wherein the liquid crystal handwriting board further comprises: a black matrix, wherein the black matrix is disposed between the plurality of pixel electrodes and the plurality of photosensitive elements, and a plurality of light apertures are defined in the black matrix, wherein the plurality of light apertures are in one-to-one correspondence to the plurality of pixel regions, an orthogonal projection of each of the plurality of light apertures on the first substrate is within the corresponding pixel region, each of the plurality of photosensitive elements corresponds to at least one of the plurality of light apertures, and the orthogonal projection of each of the plurality of light apertures on the first substrate is at least partially overlapped with an orthogonal projection of the corresponding photosensitive element on the first substrate.

13. A method for controlling a handwriting system, applicable to the handwriting system as defined in claim 12, the method comprising:
determining, by the liquid crystal handwriting board, position information of a pixel region for erasure by detecting position information of target light by the photosensitive assembly upon emission of the target light to the liquid crystal panel by the light-emitting assembly of the erasing tool; and
supplying, by the liquid crystal handwriting board, a pixel voltage to the pixel electrodes in the pixel region for erasure based on the position information of the pixel region for erasure by the control assembly, such that a voltage difference is present between the pixel electrodes in the pixel region for erasure and the common electrode.

14. The handwriting system according to claim 12, wherein in a target direction, in at least two light apertures corresponding to at least two adjacent pixel regions, an arrangement direction of any two adjacent light apertures in the at least two light apertures is intersected with the target direction, and the target direction is an arrangement direction of one row of pixel regions.

15. The handwriting system according to claim 14, wherein the plurality of light apertures comprise at least one set of light apertures, wherein positions of orthogonal projections of the light apertures in each of the at least one set of light apertures on the first substrate in the corresponding pixel region are different.

16. The handwriting system according to claim 12, wherein the first substrate comprises a first base substrate, and the plurality of pixel electrodes and a plurality of driving thin-film transistors (TFTs) that are disposed on the first base substrate, wherein the plurality of pixel electrodes are electrically connected to the plurality of driving TFTs in one-to-one correspondence; wherein
the black matrix is disposed on a side, facing away from the second substrate, of the first base substrate; or
the black matrix is disposed on a side, facing towards the second substrate, of the first base substrate, and the first substrate further comprises a first insulative layer between the black matrix and the plurality of driving TFT.

* * * * *